(12) United States Patent
Kim et al.

(10) Patent No.: US 10,007,409 B2
(45) Date of Patent: Jun. 26, 2018

(54) ELECTRONIC APPARATUS AND METHOD OF CONTROLLING THE SAME

(71) Applicant: LG ELECTRONICS INC., Seoul (KR)

(72) Inventors: Uniyoung Kim, Seoul (KR); Ryunghwa Rhee, Seoul (KR); Goeun Lee, Seoul (KR); Hyeran Jang, Seoul (KR); Kunsik Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 278 days.

(21) Appl. No.: 14/713,929

(22) Filed: May 15, 2015

(65) Prior Publication Data
US 2016/0004772 A1    Jan. 7, 2016

(30) Foreign Application Priority Data
Jul. 1, 2014    (KR) ........................ 10-2014-0082055

(51) Int. Cl.
*G06F 3/0484*    (2013.01)
*G06F 3/0481*    (2013.01)
*G06F 3/0482*    (2013.01)
*G06F 17/30*    (2006.01)
*H04N 21/482*    (2011.01)
*H04N 21/47*    (2011.01)
*G06F 3/0346*    (2013.01)
*H04N 21/422*    (2011.01)
*H04N 21/262*    (2011.01)

(52) U.S. Cl.
CPC ........ *G06F 3/04842* (2013.01); *G06F 3/0346* (2013.01); *G06F 3/0481* (2013.01); *G06F 3/0482* (2013.01); *G06F 17/30017* (2013.01); *G06F 17/30026* (2013.01); *G06F 17/30053* (2013.01); *G06F 17/3074* (2013.01); *G06F 17/30772* (2013.01); *H04N 21/42209* (2013.01); *H04N 21/47* (2013.01); *H04N 21/482* (2013.01); *H04N 21/4825* (2013.01); *G06F 2203/04803* (2013.01); *H04N 21/26258* (2013.01)

(58) Field of Classification Search
CPC ......... G06F 17/30053; G06F 17/30772; G06F 3/0482; G06F 17/3074; G06F 3/04817; H04N 21/4825; H04N 21/47; H04N 21/26258
USPC .......................................... 715/716, 810, 838
See application file for complete search history.

(56) References Cited

U.S. PATENT DOCUMENTS

| 8,750,682 | B1* | 6/2014 | Nicksay | H04N 21/2743 386/248 |
|---|---|---|---|---|
| 8,793,575 | B1* | 7/2014 | Lattyak | G09B 5/062 715/273 |
| 2006/0267995 | A1* | 11/2006 | Radloff | G11B 27/105 345/530 |

(Continued)

*Primary Examiner* — Nicholas Ulrich
(74) *Attorney, Agent, or Firm* — Birch, Stewart, Kolasch & Birch, LLP

(57) ABSTRACT

An electronic apparatus including an audio output unit configured to output audio information on a song being reproduced; a display unit; and a controller configured to arrange graphic objects linked to songs on one region of the display unit, respectively, that are included in a playlist, and display information on the reproduced song using a corresponding graphic object of the reproduced song among the graphic objects.

16 Claims, 31 Drawing Sheets

(56) References Cited

U.S. PATENT DOCUMENTS

| | | | |
|---|---|---|---|
| 2007/0039031 A1* | 2/2007 | Cansler, Jr. | H04N 21/8113 |
| | | | 725/110 |
| 2007/0296698 A1* | 12/2007 | Kanno | G06F 3/0414 |
| | | | 345/158 |
| 2009/0063971 A1 | 3/2009 | White et al. | |
| 2009/0064012 A1* | 3/2009 | Tremblay | G06F 3/0481 |
| | | | 715/764 |
| 2009/0193351 A1* | 7/2009 | Lee | G06F 3/0482 |
| | | | 715/769 |
| 2010/0058253 A1* | 3/2010 | Son | G06F 1/1616 |
| | | | 715/863 |
| 2010/0122166 A1* | 5/2010 | Chien | G06F 3/04817 |
| | | | 715/716 |
| 2013/0167029 A1* | 6/2013 | Friesen | G06F 3/167 |
| | | | 715/716 |
| 2013/0231758 A1 | 9/2013 | Kim et al. | |
| 2013/0254694 A1 | 9/2013 | Lee | |
| 2014/0123005 A1 | 5/2014 | Forstall et al. | |
| 2014/0164998 A1 | 6/2014 | Jadhav et al. | |
| 2014/0344686 A1* | 11/2014 | Lehtiniemi | H04N 1/00442 |
| | | | 715/716 |

* cited by examiner

ELECTRONIC APPARATUS AND METHOD OF CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2014-0082055, filed on Jul. 1, 2014, the contents of which are incorporated by reference herein in its entirety.

BACKGROUND OF THE DISCLOSURE

1. Field of the Disclosure

The present invention relates to an electronic apparatus and corresponding method for outputting a multimedia content.

2. Background of the Disclosure

Electronic apparatuses include apparatuses for recording and reproducing a moving image and apparatuses for recording and reproducing audio. The apparatuses for recording and reproducing the moving image include a TV set, a PC, a project, a mobile terminal, and so forth.

The electronic apparatus has multiple functions. In the recent years, the image display device has been realized in the form of a multimedia player equipped with multiple functions including photographing, shooting of video, and gaming, in addition to basic functions of receiving a broadcast and playing audio and video files.

SUMMARY OF THE DISCLOSURE

Therefore, an aspect of the detailed description is to provide an electronic apparatus that more intuitively alerts a user to information relating to reproduction of a piece of music and a method of controlling the electronic apparatus.

To achieve these and other advantages and in accordance with the purpose of this specification, as embodied and broadly described herein, the present invention provides an electronic apparatus including an audio output unit configured to output audio information on a song being reproduced; a display unit; and a controller configured to arrange graphic objects linked to songs on one region of the display unit, respectively, that are included in a playlist, and display information on the reproduced song using a corresponding graphic object of the reproduced song among the graphic objects. The present invention also provides a corresponding method of controlling an electronic apparatus.

In another aspect, the present invention provides an electronic apparatus including an audio output unit configured to output audio information on a song being reproduced; a display unit configured to output an image linked to the song; and a controller configured to change a shape of at least one portion of the image according to the reproduction of the song, and perform a gradual blurring processing on the image or gradually change a transparency of the image so the image corresponds to the extent to which the song is reproduced.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate embodiments and together with the description serve to explain the principles of the disclosure.

In the drawings.

DETAILED DESCRIPTION OF THE DISCLOSURE

Description will now be given in detail according to embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
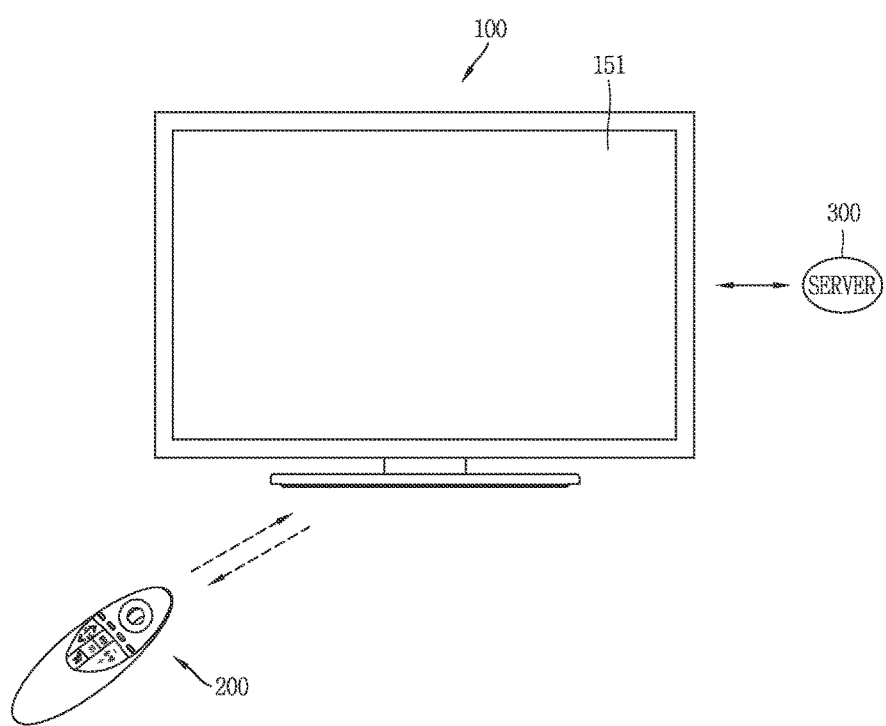
FIG. 1 is a block diagram describing an electronic apparatus according to an embodiment of the present invention and an external input device (or a remote controller)

FIG. 1 is a diagram schematically illustrating a system including an electronic apparatus 100 according to one embodiment of the present invention, a remote control device 200, a server 300. The electronic apparatuses here include a television set, a smartphone, a laptop computer, a digital-broadcast-dedicated terminal, a personal digital assistant (PDA), a portable multimedia player (PMP), a navigation system, a slate PC, a tablet PC, a high-end subnotebook computer such as a Ultrabook® subnotebook computer, and a wearable device (for example, a watch-type terminal (smart watch), a glass-type terminal (smart glass), and a head mounted display).

Further, the remote control device 200 and the electronic apparatus 100 transmit and receive a wireless signal according to RF communication standards. A control menu is displayed on a display unit 151 of the electronic apparatus 100 according to a control signal of the remote control device 200. The remote control device 200 includes multiple buttons, and generates an external input signal according to user's operation of the button. The server 300 is equivalent to a server that is provided in a broadcasting station or a server, a connection to which is established over the Internet. The electronic apparatus 100 receives a broadcast signal from the broadcasting station and outputs the received broadcast signal. In addition, the electronic apparatus 100 includes an apparatus that has access to the Internet using a Transmission Control Protocol/Internal Protocol.

Figure 2:
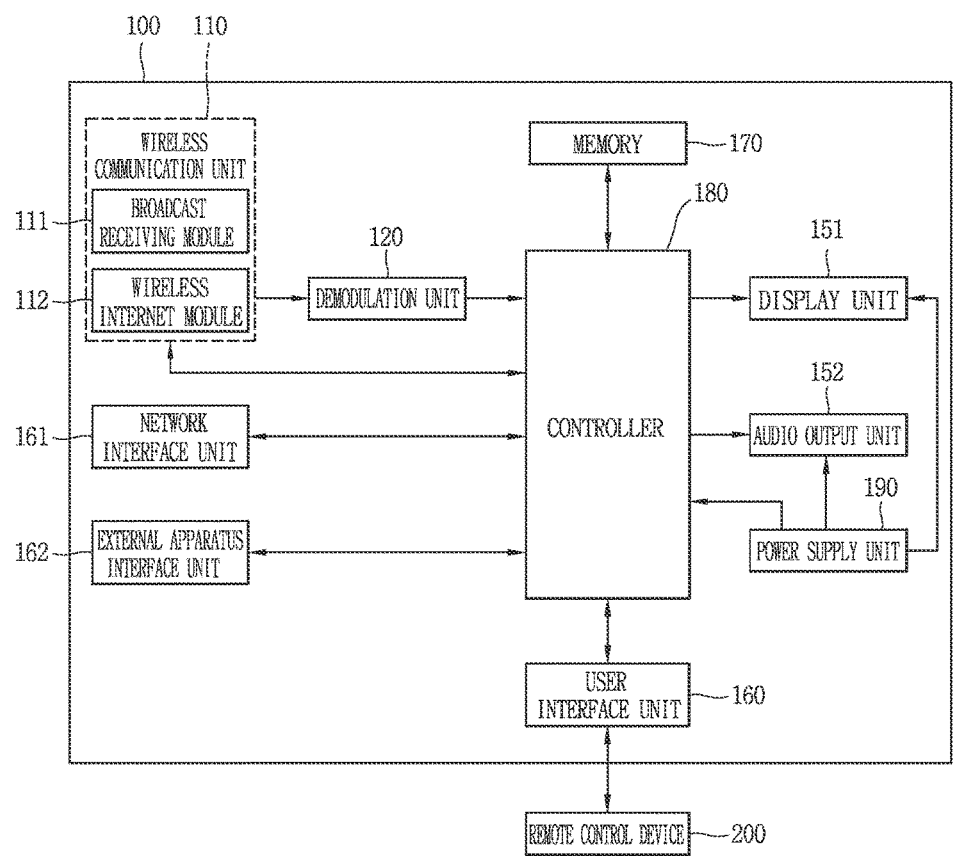
FIG. 2 is a block diagram describing the electronic apparatus in more detail in FIG. 1.

FIG. 2 is a block diagram illustrating in detail constituent elements of the electronic apparatus according to one embodiment of the present invention. Constituent elements of a TV set, as an example of the electronic apparatus, are described below. Further, for an electronic apparatus other than the TV set, some of the constituent elements described below are omitted or some more constituents are included.

As illustrated in FIG. 2, the electronic apparatus 100 according to one embodiment of the present invention is configured to include a wireless communication unit 110, a demodulation unit 120, a network interface unit 161, an external apparatus interface unit 162, a memory 170, a controller 180, a display unit 151, an audio output unit 152, a power supply unit 190, a user interface unit 160 and the like. Further, the electronic apparatus 100 performs data communication with the remote control device 200.

A broadcast receiving module 111, for example, is designed as an RF tuner, or as an interface through which to receive broadcast data from an external device such as an STB. The broadcast receiving module 111, for example, receives an RF broadcast signal over a single carrier in accordance with Advanced Television System Committee (ATSC) standards or the RF broadcast signal over multiple carriers in accordance with Digital Video Broadcasting (DVB) standards.

The demodulation unit 120 receives a digital IF signal (DIF) that results from converting in the broadcast receiving module 111 and performs a demodulation operation. For example, if the digital IF signal that is output from the broadcast receiving module 111 is of the ATSC type, the demodulation unit 120, for example, performs 8-Vestigial Side Band (8-VSB) demodulation. In addition, the demodulation unit 120 may perform channel decoding.

The external apparatus interface unit 162 enables the data communication between an external apparatus and the electronic apparatus 100. The external apparatus interface unit 162 is connected, in a wire or wireless manner, to the external apparatus, such as a digital versatile disk (DVD) player, a Blu-ray disk player, a game apparatus, a camera, a camcorder, or a personal computer (notebook computer) or an STB. The external apparatus interface unit 162 transfers to the controller 180 an image, audio or data signal that is input externally through the connected external apparatus. In addition, the image, the voice, or the data signal that is processed in the controller 180 is output to the external apparatus.

The external apparatus interface unit 162, for example, includes a USB port, a Composite Video Banking Sync (CVBS) port, a composite port, an S-video port (analog), a Digital Visual Interface (DVI) port, a High Definition Multimedia Interface (HDMI) port, a RGB port, a D-SUB port, and the like. The network interface unit 161 provides an interface for connecting the electronic device 100 to a wire/wireless network, such as the Internet. The network interface unit 161 includes, for example, an Ethernet port for the connection to the wire network. For the connection to the wireless network, telecommunication standards are used such as Wireless LAN (WLAN) (Wi-Fi), Wireless broadband (Wibro), World Interoperability for Microwave Access (Wimax), and High Speed Downlink Packet Access (HSDPA).

The network interface unit 161 transmits or receives data to and from a different user or a different electronic apparatus over a connected network, or over a different network linked to the connected network. A program for signal processing and control within the controller 180, and the image or the audio or data signal that is signal-processed may be stored in the memory. In addition, the image, the audio, or the data signal that is input from the external apparatus interface unit 162 or the network interface unit 161 may be temporarily stored in the memory 170. In addition, various operating systems (OS), middleware, and platforms are stored in the memory 170.

A signal that is input by the user is transferred to the controller 180 through the user interface unit 160, or a signal is transmitted from the controller 180 to an external device (for example, the remote control device 200) through the user interface unit 160. For example, the user interface unit 160 is designed so in accordance with various communication standards such as Radio Frequency (RF) communication standards, and IR communication standards, the user interface unit 160 receives from the remote control device 200 control signals for power on/off, channel selection, screen setting, and the like and processes the control signals, or transmits a control signal from the controller 180 to the remote control device 200.

Through the broadcast receiving module 111, the demodulation unit 120, and the network interface unit 161 or the external apparatus interface unit 162, the controller 180 demultiplexes a stream being input or processes demultiplexed signals to generate and output signals for outputting the image and the audio. The controller 180 is described below in detail referring to the accompanying drawings.

An image signal, a data signal, and an OSD signal that are processed in the controller 180 or an image signal and a data signal that are received through the external apparatus interface unit 162 are converted into signals for driving RGB light sources for display of colors on the display unit 151. A PDP display, an LCD display, and an OLED display are available for the display unit 151. The display unit 151 can be in the form of a flexible display or can realize a 3D display.

A signal, such as a stereo signal, a 3.1 channel signal, or a 5.1 channel signal, that is audio-processed in the controller 180, is input into the audio output unit 152 to be output as the audio. The audio output unit 152 is realized as various types of speakers. Then, the power supply unit 190 supplies electric power to the entire electronic apparatus 100. Particularly, the electric power is supplied to the controller unit 180 that can be realized in the form of a system-on-chip (SOC), the display unit 151 for the display of the image, and the audio output unit 152 for the output of the audio.

Specifically, according to the embodiment of the present invention, descriptions are provided as follows. Under the control of the controller 180, the network interface 161 has access to a specific server. Furthermore, IR code values received from the specific server are designed to be stored in the memory 170. Further, the IR code values are values necessary for controlling an electric device, the connection to which is established through the external apparatus interface 162.

Last, at the request of the remote control device 200, the IR code value corresponding to a specific function of a specific electronic device is transmitted to the remote control device 200 through the user interface unit 160. As described above, In addition, a type of communication in accordance with Bluetooth standards is employed.

A method is described in detail below in which if multimedia data (or file), for example, music or the like, is reproduced in the electronic apparatus described above, information on a file being reproduced is provided by utilizing an image associated with the file. The multimedia files described according to an embodiment of the present invention include at least one among a music file and a moving image. For description convenience, the multimedia file is referred to as a "multimedia object" throughout the present specification. Furthermore, throughout the present specification, if music corresponding to the music file is reproduced, this is expressed "music is reproduced," or "a song is reproduced, and for convenience, a term "music file" is expressed as "music," or "song."

The multimedia file is stored in the memory 170 included in the electronic apparatus, or is a file that is streamed through the wireless communication unit 110. At this time, the multimedia file is present when it is stored in an external server. The external server in which the multimedia file that is a streaming target is stored is specified by user's selection. Furthermore, the multimedia that is the streaming target is accessible through an application that is installed on the electronic apparatus. One or more application associated with the reproduction of the multimedia file are installed on the electronic apparatus. Based on the user's selection, it is determined whether or not the application is installed, what type of application is installed, and so forth.

Figure 3:
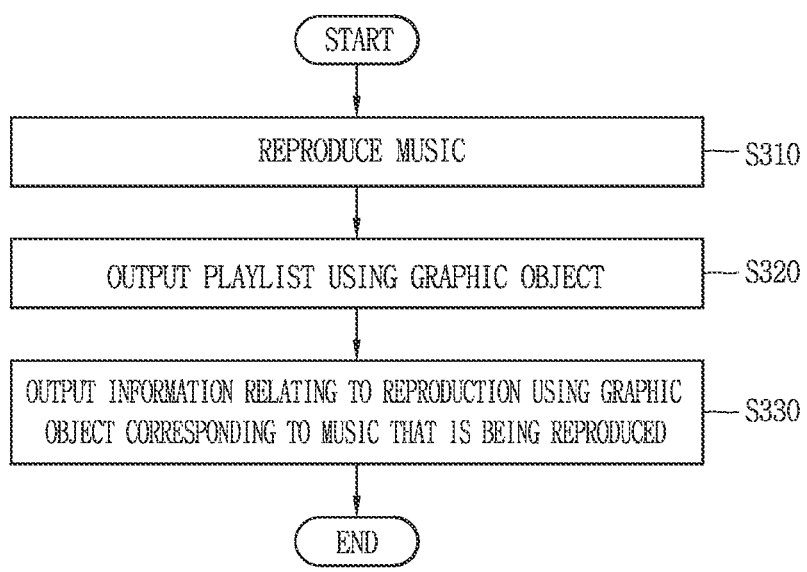
FIG. 3 is a flowchart illustrating a method of controlling the electronic apparatus according to an embodiment of the present invention.

The multimedia file that is reproducible on the electronic apparatus regardless of a type of storage where the multimedia file is present is described in detail below. In particular, FIG. 3 is a flowchart illustrating a method of controlling the electronic apparatus according to an embodiment of the present invention, and FIGS. 4A(a) to 4C(b) are diagrams describing the control method described referring to FIG. 3.

As described, music is reproduced on the electronic apparatus (S310). In addition, based on the user's selection, the controller 180 determines whether or not the music is reproduced and what type of music is reproduced. When the music is reproduced in this manner, audio information on a song (music) being reproduced is output from the audio output unit 152. Subsequently, a playlist is output using a graphic object along with the audio information (S320). According to an embodiment of the present invention, Steps 310 and 320 are not necessarily performed in chronological order. That is, while the audio information is being output, information relating to the reproduction may be displayed on the display unit 151.

Further, the playlist here is a list of music files that are reproduction targets when the music is reproduced, and may be expressed also as a "reproduction list." More specifically, the playlist is understood as a group to which at least one or more pieces of music belong, as a folder on which at least one or more pieces of music are stored. One or more playlists can be present. If any one of the playlists is specified by the user's selection or the like, the controller 180 reproduces only songs that are included in the specified playlist. For example, if 20 songs are stored in the memory, and among them, 10 songs are included in the specific playlist, the controller 180 reproduces only the songs that are included in the playlist, corresponding to a request for reproduction of the specific play. Further, the songs to be included in the playlist are determined by the user's selection.

Further, according to an embodiment of the present invention, a graphic object linked to each piece of music (or each song) means a jacket image of an album (a photograph record) corresponding to each song, a jacket image of an album in which each song is included, or a specific image linked to each song. In addition, an image or a graphic object that corresponds to each of the music files is linked to the music file and thus, when the music file is stored or downloaded, the image or graphic object is downloaded, or is linked to the music file by the user's setting.

For example, the graphic object (or the image) corresponding to each song is present when it is included in the music file corresponding to each song. That is, the music file includes both an image and a sound source. As another example, the graphic object (or the image) is set to be linked to a specific song, based on the user's selection, through the user interface provided by the electronic apparatus. In this instance, the image linked to each of the songs is stored in the memory.

Further, the graphic object is a thumbnail of a jacket image or of a specific image. Further, if a song is present that is not linked to a graphic object, the controller 180 utilizes a default image. In addition, the controller 180 utilizes pieces of information (for example, a singer name, a song title, or the like) on the song and thus the pieces of information on the song are output to a position to which the graphic object is output.

Further, in the electronic apparatus according to an embodiment of the present invention, if a predetermined playlist is not present, the controller 180 regards all the songs stored on the electronic apparatus as the songs that are included in the playlist, or regards the songs that are stored on a specific folder as the songs that are included in the playlist.

Figure 4A:
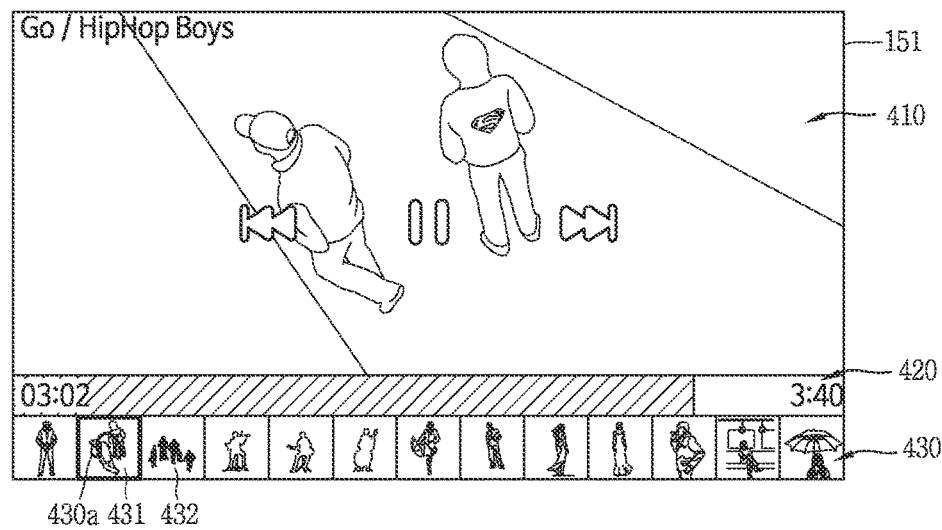
FIGS. 4A(a) and 4A(b), FIGS. 4B(a) and 4B(b), and FIGS. 4C(a) and 4C(b) are diagrams describing the control method in FIG. 3.
Figure 4A:
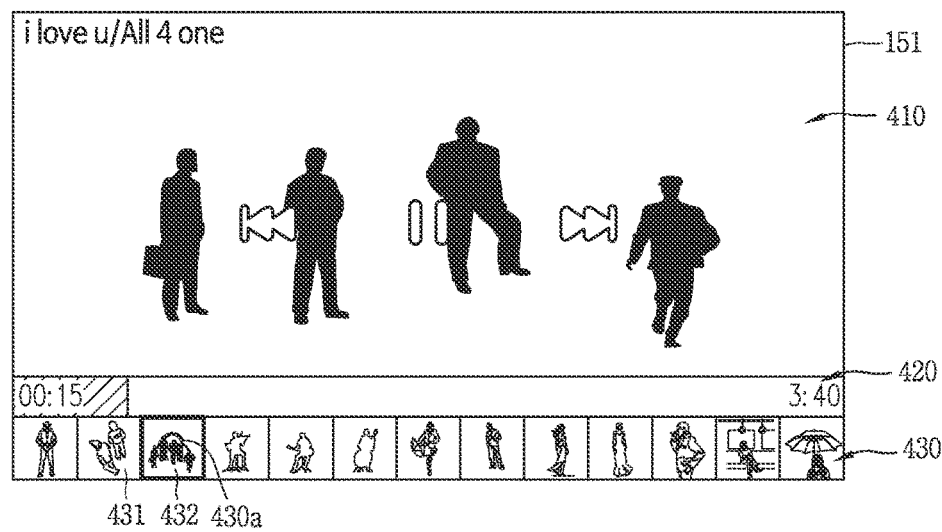

The method of outputting the playlist using the graphic object is described in more detail. As illustrated in FIGS. 4A(a) and 4A(b), graphic objects (graphic objects 431 and 432 occupying sub-regions included one region 430) that correspond to the songs included in the playlist, respectively, are arranged on the region 430.

According to an embodiment of the present invention, order in which the graphic objects are arranged corresponds to order in which the songs included in the playlist are reproduced. That is, the graphic objects are arranged in the order in which the songs included in the playlist are reproduced. Accordingly, when the reproduction of a song corresponding to any one graphic object 431 is finished, a song corresponding to a different graphic object 432 adjacent to the graphic object 431 is reproduced.

Further, only the graphic objects, as illustrated, are arranged on the one region 430, but the controller 180 additionally outputs pieces of information (for example, information such as the song title, the singer name, reproduction time) corresponding to each graphic object to at least one portion of each graphic object. Further, according to an embodiment of the present invention, a step of outputting the information relating to the reproduction using the graphic object corresponding to the music that is being reproduced currently is performed (S330). Further, in Step S310 and Steps 320 and 330 that are performed before S310 are not necessarily performed in chronological order. That is, while the audio information is output, the information (for example, the information on the playlist) relating to the reproduction is output on the display unit 151, and furthermore, the information on the music that is currently reproduced is output using the graphic object.

For example, as illustrated in FIG. 4A(a), the controller 180 outputs indication information (for example, an indicator 430a) indicating that the song is being reproduced currently, to at least one portion, or in the vicinity of the graphic object 431 corresponding to the song that is being reproduced currently, among the graphic object that are arranged on the one region 430. The indicator 430a is superimposed onto the graphic object 431. In another case, the indicator 430a is output to a region in the vicinity of the graphic object 431, which is positioned away from the region to which the graphic object 431. The indicator 430a has the shape of a specific image, and a visual appearance of the specific image varies widely.

Further, as described above, the order in which the songs included in the playlist are reproduced corresponds to the order in which the graphic objects are arranged, and thus when the reproduction of the song that is being reproduced currently is finished, the song corresponding to the graphic object adjacent to the graphic object 431 is reproduced. In this instance, as illustrated in FIG. 4A(b), the indicator 430a is superimposed onto the adjacent graphic object 432 or can be output to the vicinity of the adjacent graphic object 432.

Thus, only with the order in with the graphic objects are arranged, the order in which the songs included in the playlist and the pieces of information on the songs to be successively reproduce are intuitively obtained. Furthermore, the information on the currently reproduced song is easily obtained through alerting information such as the indicator, and additionally status information on which of the songs included in the playlist is being reproduced currently is intuitively obtained.

Another example of providing reproduction information by utilizing the graphic object will now be described. The controller 180, as illustrated in FIGS. 4B(a) and 4B(b), a guiding image is superimposed onto a graphic object corresponding to the song included in the playlist, of which the reproduction is finished, among the graphic objects arranged on the one region 430.

That is, the controller 180 displays the graphic objects in a manner that distinguishes between the graphic objects corresponding to the songs of which the reproduction is finished and the graphic objects corresponding to the songs of which the reproduction is not finished. As one example of the method of doing so, the guiding image is utilized. According to an embodiment of the present invention, the guiding image varies widely in shape. More specifically, as illustrated, if the reproduction of the first song is finished and then the second song is being reproduced, a guiding image 430b having a specific shape is output to a graphic object 433 corresponding to the first song. The guiding image 430b here is a cover image that is formed to cover an entire graphic object 433. Further, if the reproduction of up to the second song is finished, as illustrated as in FIG. 4B(b), the guiding image 430b covering up to the graphic object 431 corresponding to the second song is output. That is, the greater the number of songs the production of which is finished, the greater the display size of the guiding image 430b.

Furthermore, the controller 180 controls the display unit 151 so the guiding image is output to cover up to the graphic object corresponding to the song that is being reproduced. For example, as illustrated as FIGS. 4C(a) and 4C(b), as the song is reproduced, the guiding image is gradually superimposed onto the graphic image 431 corresponding to the song that is being reproduced currently. In this instance, an area of the guiding image or an area of the graphic object 431 onto which the guiding image is superimposed varies with the extent to which the song is being reproduced. Thus, the user more easily obtains information on a reproduction progress state of the song that is being reproduced currently.

Figure 4B:
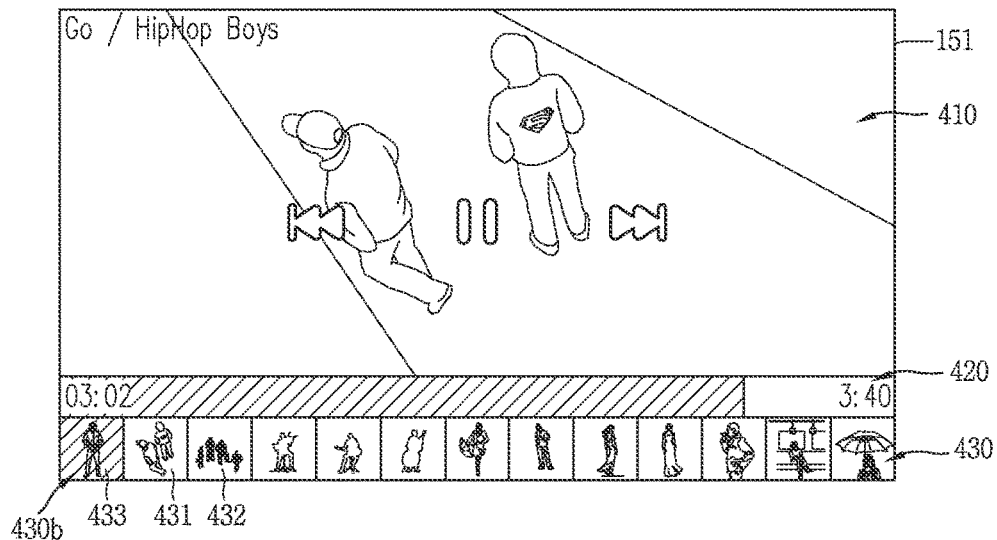
Figure 4B:
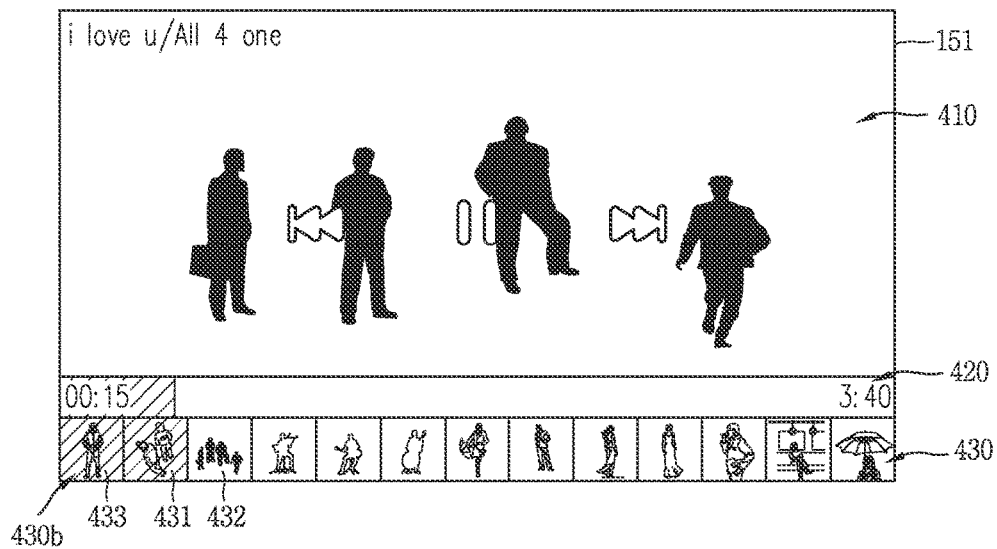
Figure 4C:
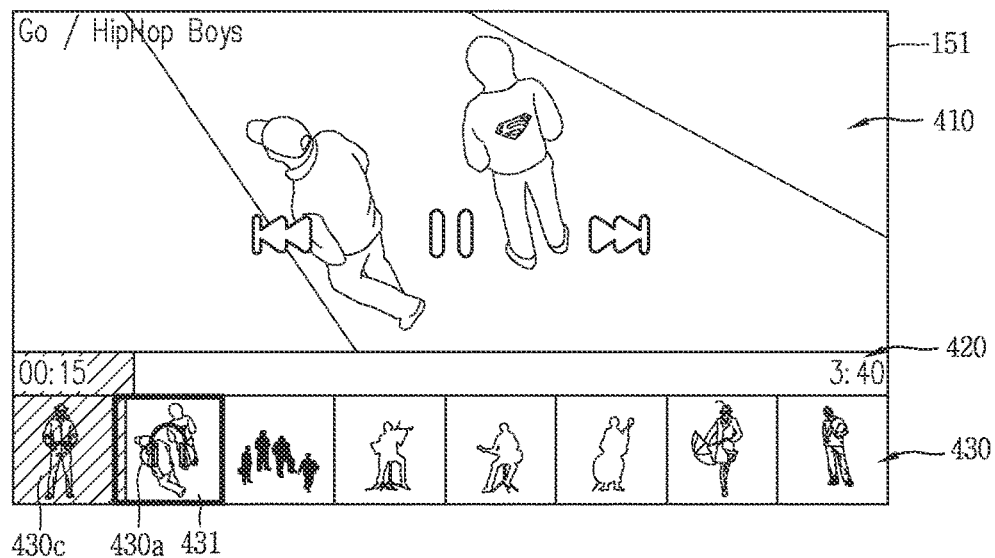
Figure 4C:
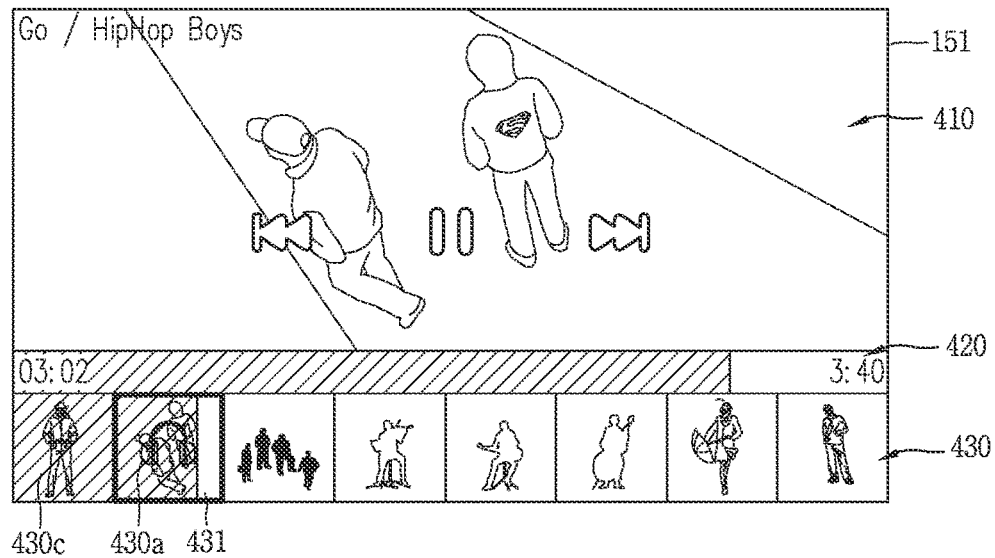

Further, the indicator (refer to the indicator 430a in FIGS. 4A(a) and 4A(b) is additionally output to the graphic object (for example, refer to the graphic object 431 in FIGS. 4B(a) and 4B(b)). That is, in this instance, the user is provided with the information on the song the reproduction of which is finished, through the guiding image, and is provided with the information on the song that is being reproduced currently, through the indicator.

Further, the terms such as the guiding image and the indicator are used throughout the present specification, but the present invention is not limited to these terms. It is apparent to a person of ordinary skill in the art that other terms are substituted for these terms within a range that does not depart from the nature and scope of the present invention.

Furthermore, according to the embodiment, the method is described above in which the controller 180 outputs the guiding image to the graphic object corresponding to the song the reproduction of which is finished, but the present invention is not limited to this. That is, according to an embodiment of the present invention, various methods can be employed in which the graphic objects that correspond to the songs the reproduction of which is finished and the graphic objects that correspond to the songs the reproduction of which is not finished are distinguished from each other. For example, the controller 180 performs processing so the graphic object corresponding to the song the reproduction of which is finished is transparent. As another example, the controller 180 changes a luminance, saturation, brightness, color, and the like of the graphic object corresponding to the song the reproduction of which is finished and thus distinguishes between the graphic objects that correspond to the songs the reproduction of which is finished and the graphic objects that correspond to the songs the reproduction of which is not finished.

Figure 5A:
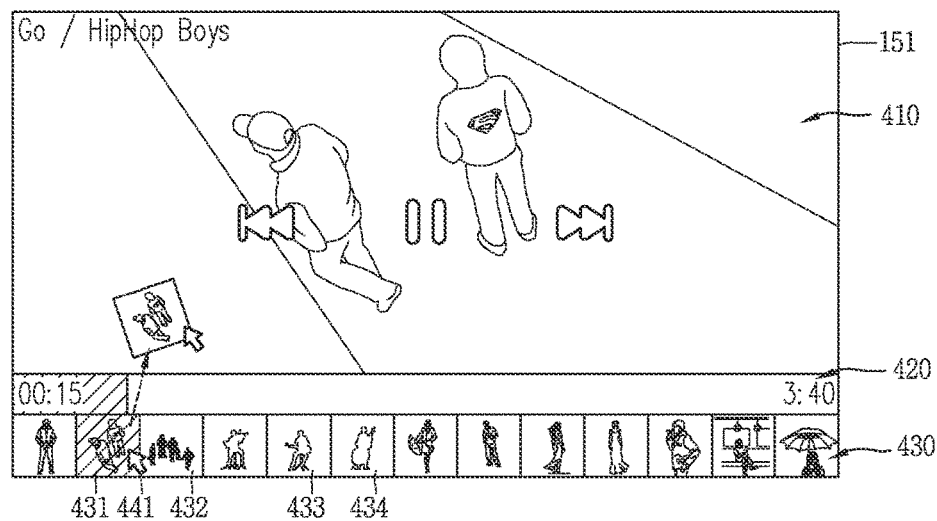
FIGS. 5A(a) to 5A(c), 5B(a) and 5B(b), and 5C are diagrams describing a method of performing control associated with music reproduction by utilizing a graphic object in the electronic apparatus according to an embodiment of the present invention.
Figure 5A:
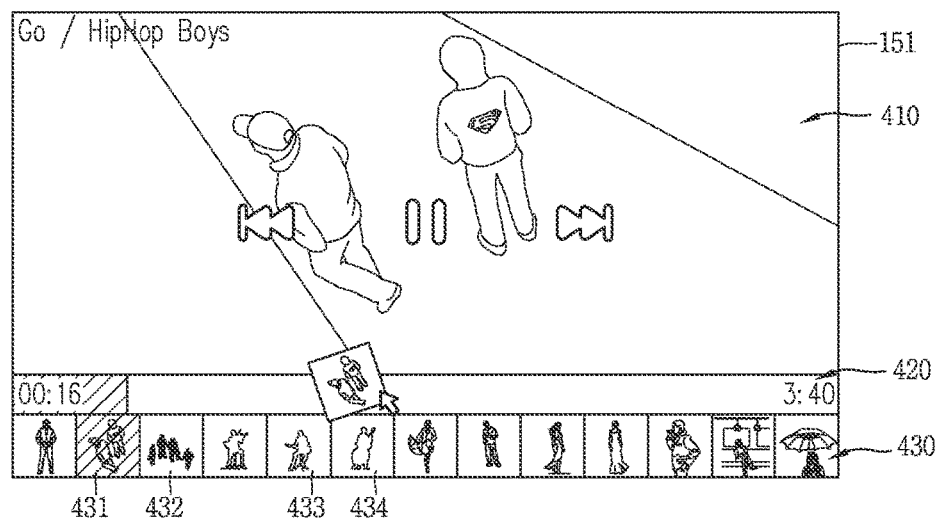
Figure 5A:
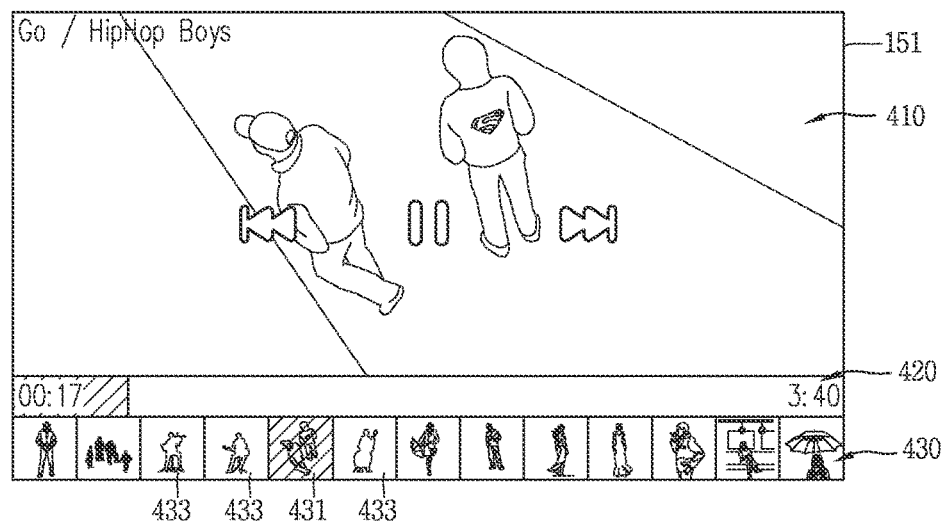

A method of utilizing the graphic objects corresponding to the songs that are included in the playlist is described in detail below referring to the accompanying drawings. FIGS. 5A(a) to 5A(c), 5B(a) and 5B(b), and 5C are diagrams describing a method of performing control associated with music reproduction by utilizing a graphic object in the electronic apparatus according to an embodiment of the present invention.

As described above, the graphic objects being output to the one region 430 are linked to the songs included in the playlist, and thus according to an embodiment of the present invention, the playlist is edited or control is performed on each of the songs by utilizing these graphic objects. That is, when any one graphic object is selected from among the arranged graphic objects, the controller 180 performs a function associated with the song corresponding to the selected graphic object.

Further, the editing of the playlist means changing the order in which the songs included in the playlist are reproduced, excluding at least one among the songs included in the playlist from the playlist, or the like. As one example, the controller 180 changes the order in which the songs included in the playlist are reproduced, corresponding to a change in the order in which the graphic objects are arranged, due to the movement of the graphic object based on the user's selection.

As illustrated in FIGS. 5A(a) to 5A(c), the graphic objects arranged in the one region 430 are configured to be movable based on the user's request or the user's selection. That is, display positions of the graphic objects are changed based on the user's request or on the user's selection. In addition, the user's request corresponds to a remote control signal that is received from the remote controller (or the remote control device 200) described referring to FIG. 1. That is, the user's request or the user's selection is made through the remote controller described referring to FIG. 1.

A pointer image 441, as illustrated in FIGS. 5A(a) to 5A(c), is output to the display unit 151. The pointer image 441 is moved, corresponding to the remote control signal that is received from the remote controller. Furthermore, the controller 180 performs control associated with the graphic object 431 that the pointer image 441 points to. In this instance, the user controls the graphic objects being output to the display unit 151 by utilizing the pointer image 331 that is controlled according to the remote control signal that is received from the remote controller. For example, when a specific graphic image 431 is selected, the pointer image 441 is moved, as the pointer image 441 is moved, the selected specific graphic image 431 is moved.

Further, the pointer image 441 is output at the user's request. Alternatively, the pointer image 441 is output when the user who wants to use the remote controller is detected as moving (for example, such as when the remote controller is moved, or when the user is detected as holding the remote controller in his/her hand).

Further, the remote control signal for moving the pointer image 441 or the graphic object is received, corresponding to the movement of the remote controller. That is, in this instance, sensors that detect the movement of the remote controller are arranged on the remote controller. The sensor is at least one among an acceleration sensor, a magnetic sensor, a G-sensor, a gyroscope sensor and a motion sensor. Accordingly, if the user moves, holding the remote controller in his/her hand, the remote controller generates the remote control signal corresponding to the user's movement. Furthermore, the controller 180 utilizes the remote control signal in controlling the graphic object. Thus, according to an embodiment of the present invention, the user's movement is detected in three-dimensional space by utilizing the sensors that detect the movement of the remote controller, and corresponding to the detected user's movement, the movement of the graphic object is controlled.

As another example, the remote control signal for moving the pointer image 441 is generated, corresponding to user's operation of a wheel, a touch pad, a directional key button, or the like that is mounted in the remote controller. Further, only if the graphic object that the pointer image 441 points to is selected, the controller 180 moves the graphic object, corresponding to a signal that is received from the remote controller. In addition, processing is performed, corresponding to the selection of the graphic object, or the remote control signal that is received from the remote controller. There are various methods of selecting the graphic object through the remote controller.

As another example, according to an embodiment of the present invention, the display unit 151 is realized as a touch screen, and the controller 180 selects or moves the graphic object, corresponding to a user's touch on the touch screen. Thus, the graphic object or the pointer image 441 that is output to the display unit 151 is moved or selected in various ways. A detailed description of a method of selecting or moving the graphic image or the pointer image 441 is omitted, and a function that is performed according to the selection or the movement that is described above is described in detail below.

As another example, if the one graphic image 431 as illustrated in FIG. 5A(a) is moved to a different position as illustrated in FIG. 5A(b), the controller 180 changes the turn for the song corresponding to the graphic object 431 to be reproduced. That is, the graphic object is rearranged in a position based on the user's selection, among the arranged graphic objects, and based on the rearrangement, the order in which the graphic objects are arranged is changed. Then, the order in which the graphic objects are arranged corresponds to the reproduction order, and as a result, the order in which the songs are reproduced is changed, corresponding to the movement of the graphic object.

Figure 5B:
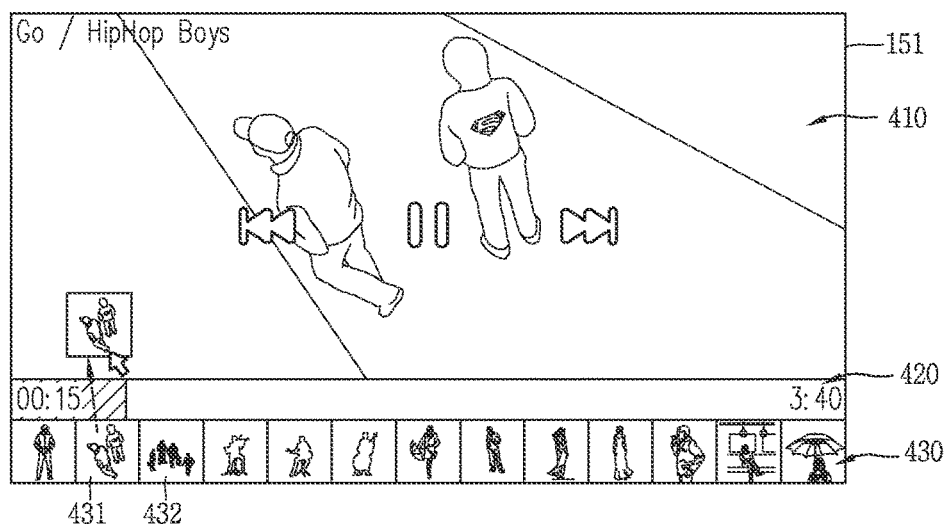
Figure 5B:
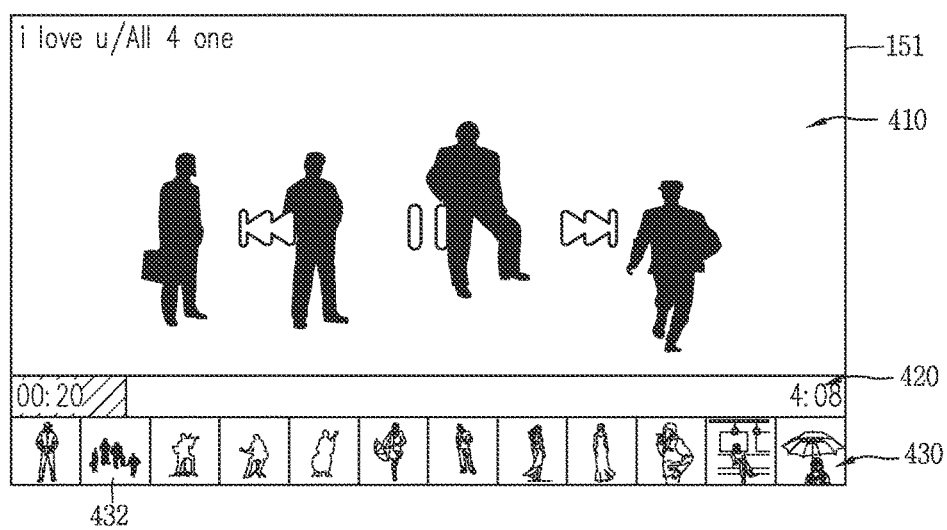

As another example, based on the selection, the movement, or the like of the graphic object, the controller 180 excludes at least one song from the playlist. For example, if the selected graphic object 431, as illustrated in FIG. 5B(a), is moved by a predetermined distance or above, the controller 180 excludes the song corresponding to the selected graphic object 431 from the playlist. In addition, as another example, if a specific graphic object remains selected or long-pressed for a predetermined time, the controller 180 excludes a song corresponding to the specific graphic object from the playlist. Furthermore, when the song corresponding to the selected graphic object 431 is excluded from the playlist, the selected graphic object 431 is not arranged together with the other graphic objects included in the one region 430. That is, the controller 180 no longer outputs on the display unit 151 the graphic object corresponding to the song excluded from the playlist.

Figure 5C:
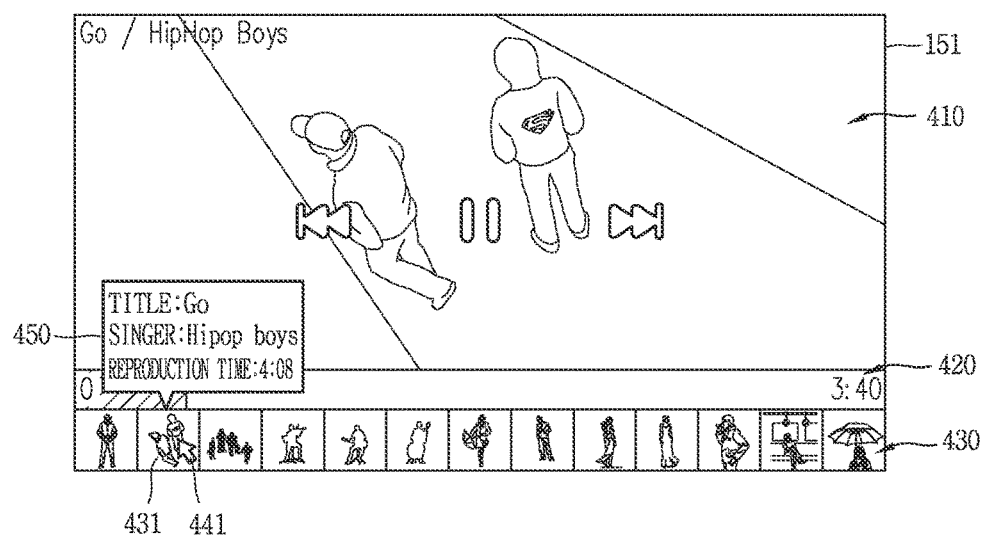

Furthermore, the mobile terminal according to an embodiment of the present invention, as illustrated in FIG. 5C, outputs information 450 on the song corresponding to the graphic object 441 that is output to a region in which the pointer image 441 is positioned. That is, in this instance, even though a specific graphic object is not selected, the controller 180 provides the song information relating to the graphic object 441 that the pointer image 441 points to.

As described above, the electronic apparatus according to an embodiment of the present invention provides pieces of intuitive information on the songs included in the playlist and a control method by utilizing the graphic objects.

Figure 6A:
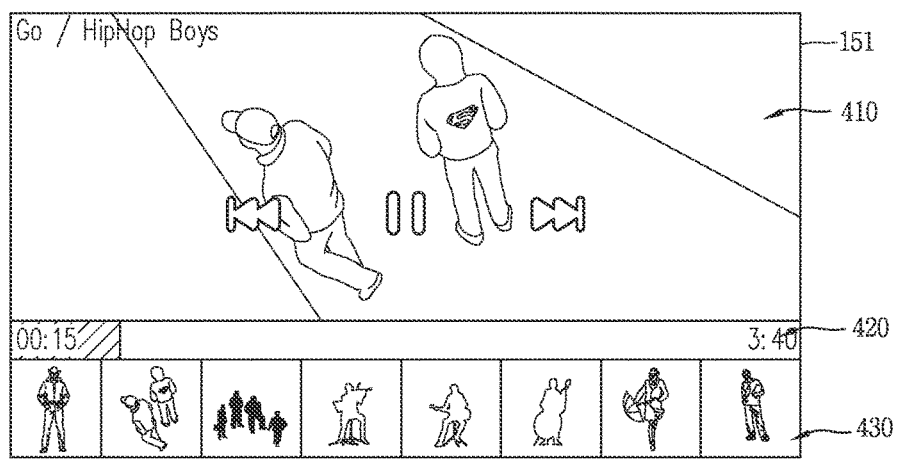
FIGS. 6A(a) and 6A(b) and 6B are diagrams describing a method of outputting the graphic object according to an embodiment of the present invention.
Figure 6A:
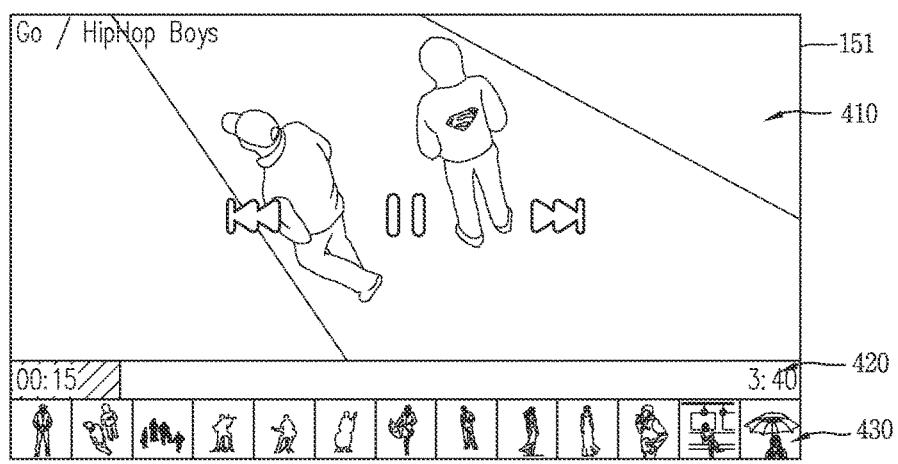
Figure 7A:
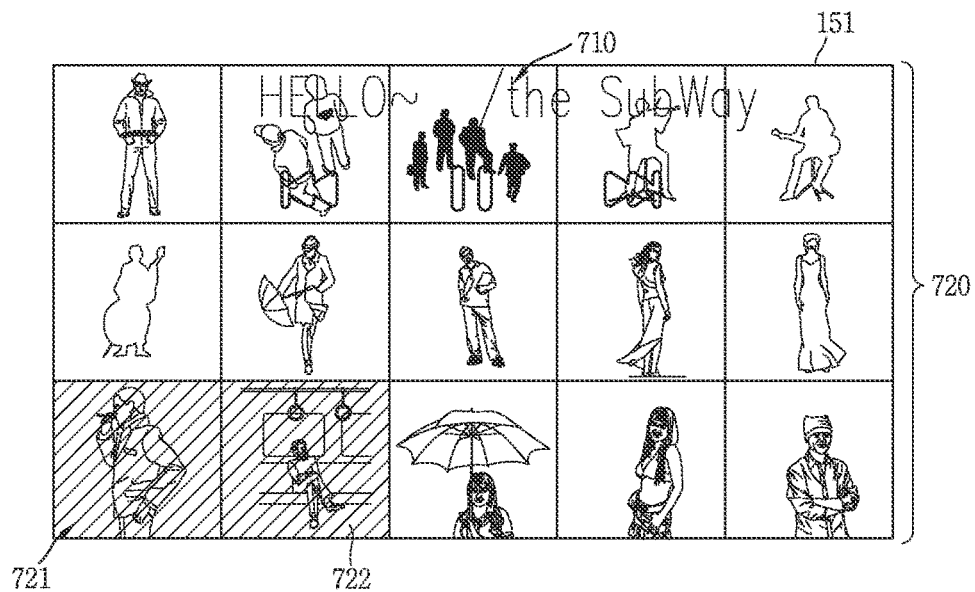
FIGS. 7A(a) to 7A(c) and 7B(a) to 7B(c) are diagrams describing information on a playlist that is provided by utilizing the graphic object according to another embodiment of the present invention.
Figure 7A:
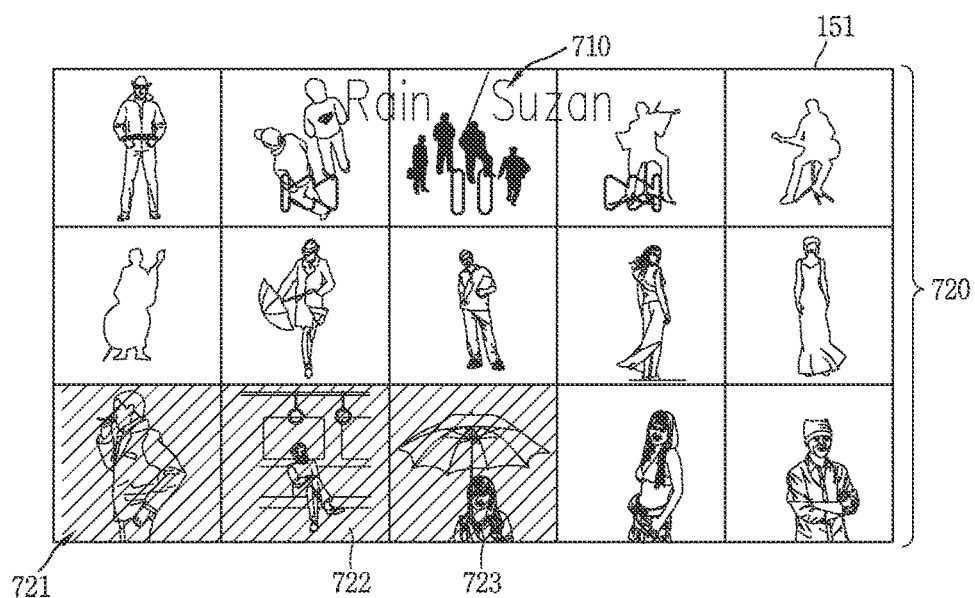
Figure 7A:
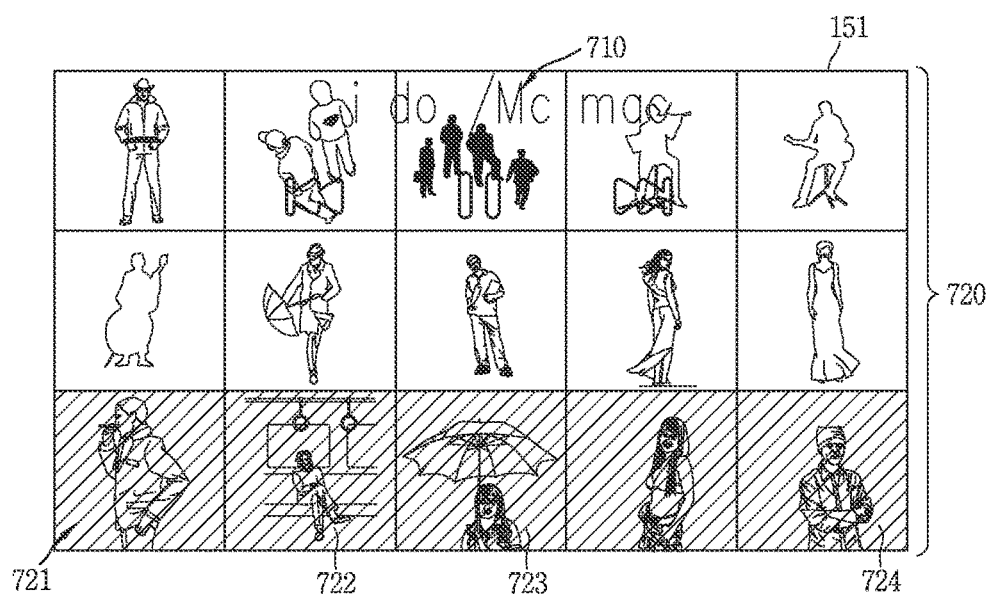

The graphic objects corresponding to the songs included in the playlist, which are output, according to various embodiments, are described in more detail below referring to the accompanying drawings. FIGS. 6A(a) and 6A(b) and 6B are diagrams illustrating reproduction information that is provided by utilizing the graphic object according to an embodiment of the present invention. FIGS. 7A(a) to 7A(c) and 7B(a) to 7B(c) are diagrams describing information on the playlist that is provided by utilizing the graphic object according to another embodiment of the present invention.

In the electronic apparatus according to an embodiment of the present invention, positions of regions to which the graphic object corresponding to the songs included in the playlist are output are specified in advance. For example, as illustrated in FIGS. 6A(a) and 6A(b), a lower region of the display unit 151 is designated as the region on which the graphic objects are displayed. In this instance, the graphic objects are output to only within the predetermined region 430. Accordingly, according to the number of songs included in the playlist, the controller 180 determines display sizes of the graphic objects.

For example, as illustrated in FIGS. 6A(a) and 6A(b), the smaller the number of songs included in the playlist, the larger the display sizes of the graphic objects. That is, the controller 180 outputs the graphic objects so a specific region is occupied, and in this instance, the display sizes of the graphic objects are determined based on the number of songs included in the playlist.

Further, in the present specification, only one is specified among a longitudinal length and a transverse length of the region on which the graphic objects are displayed. As one example, the transverse length of the region 430 on which the graphic objects are displayed is fixed. The transverse length of the region 430 on which the graphic objects are displayed corresponds to a display region that corresponds to a transverse length of the display unit 151. Even in this instance, the display size of the graphic object is determined based on the number of songs included in the playlist. Furthermore, the graphic objects are output in the form of a square, and in this instance, the longitudinal length of the region 430 varies with the number of songs included in the playlist.

In addition, the display size of the graphic object is determined according to the reproduction time to reproduce the songs included in the playlist. In this instance, based on the size of the graphic object, the user makes a relative comparison between the reproduction time to reproduce a specific song and the reproduction time to reproduce any other song.

The graphic objects are output within the predetermined region 430 so each of the graphic objects has a size corresponding to the reproduction time to reproduce the song that corresponds to each of the graphic objects. In this instance, the controller 180 changes at least one among the transverse length and the longitudinal length of each of the graphic objects, and thus causes the reproduction time and the size of each of the graphic object to correspond to each other.

Figure 6B:
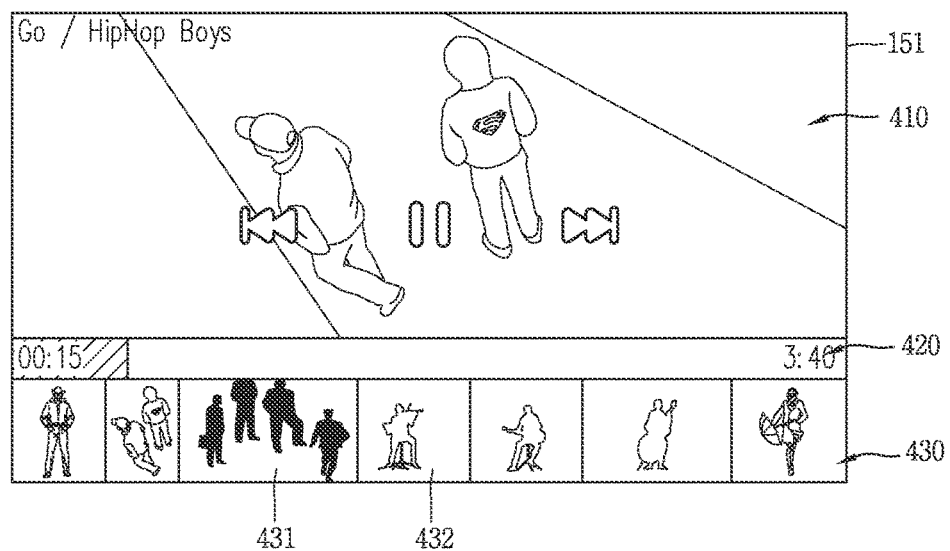

For example, as illustrates in FIG. 6B, the transverse length of each of the graphic objects is determined according to the reproduction time to reproduce the song corresponding to each of the graphic objects. As illustrated, the reproduction time to reproduce a song corresponding to a first graphic object 431 is longer than the reproduction time to reproduce a song that corresponds to a second graphic object 432.

Figure 7B:
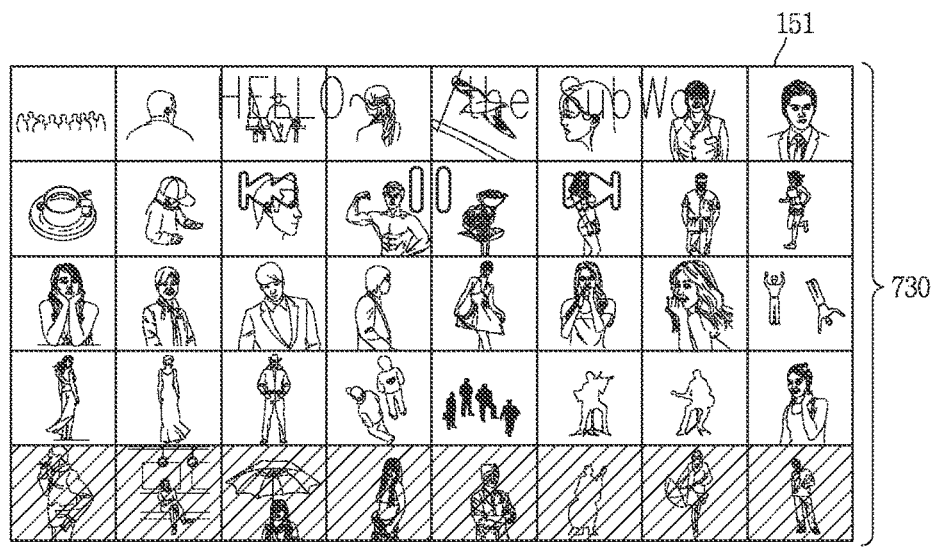
Figure 7B:
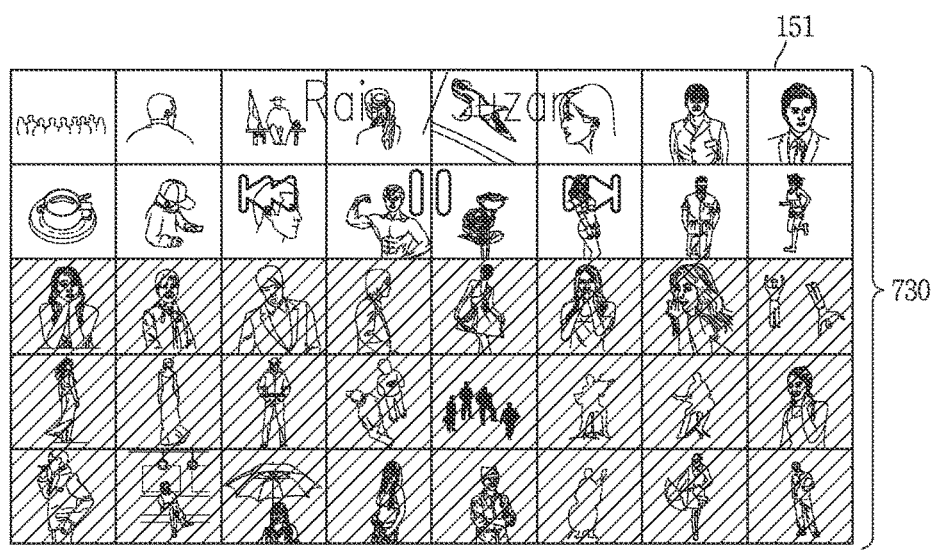
Figure 7B:
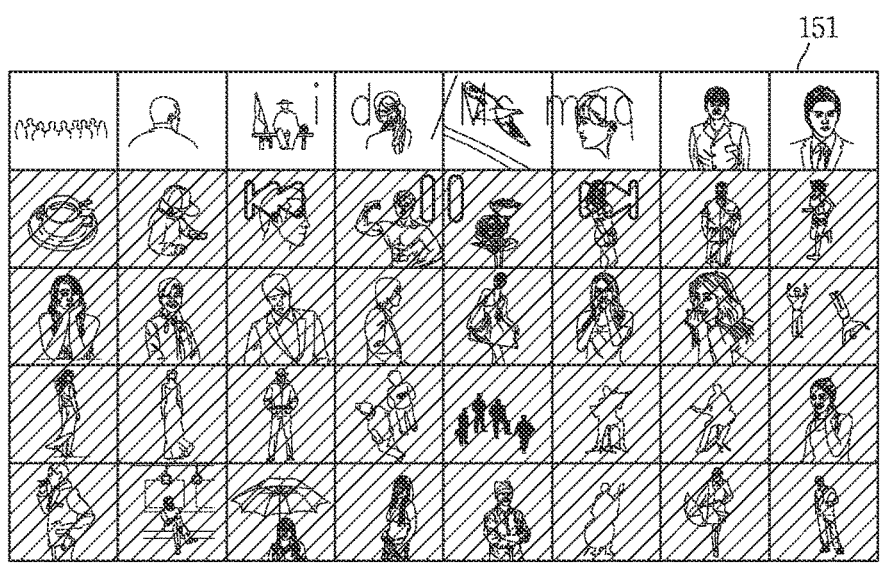

Further, in the electronic apparatus according to an embodiment of the present invention, the graphic objects that correspond to the songs included in the playlist are output in varying shapes on the display unit 151. For example, as illustrated in FIGS. 7A(a) to 7A(c) and FIG. 7B(a) to 7B(c), the controller 180 outputs the graphic objects on the entire display region of the display unit 151. In addition, the size of each of the graphic objects varies with the number of songs included in the playlist. Also, according to an embodiment of the present invention, a size of the region to which the graphic objects are output is determined based on the number of songs included in the playlist. Further, the guiding images that are output to the graphic images according to the embodiment, which are illustrated in FIGS. 7A(a) to 7A(c) and 7B(a) to 7B(c), are similar to those described referring to FIGS. 4B(a) to 4B(b) and FIGS. 4C(a) and 4C(b), and thus a detailed description of the guiding images illustrated in FIGS. 7A(a) to 7A(c) and 7B(a) to 7B(c) is not repeated.

Figure 8A:
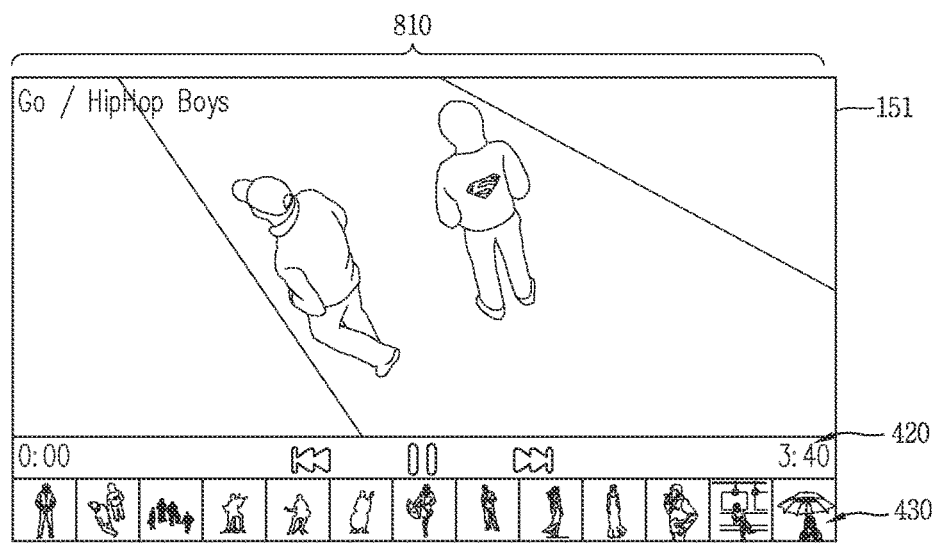
FIGS. 8A(a) to 8A(c), 8B(a) to 8B(c), 8C(a) to 8C(c), 8D(a) and 8D(b), 9A(a) to 9A(c), 9B(a) to 9B(c), 9C(a) and 9C(b), 9D(a) and 9D(b), 9E(a) and 9E(b), and 9F(a) and 9F(b) are diagrams describing a method of providing information on a song that is being reproduced currently in the electronic apparatus according to an embodiment of the present invention.
Figure 8A:
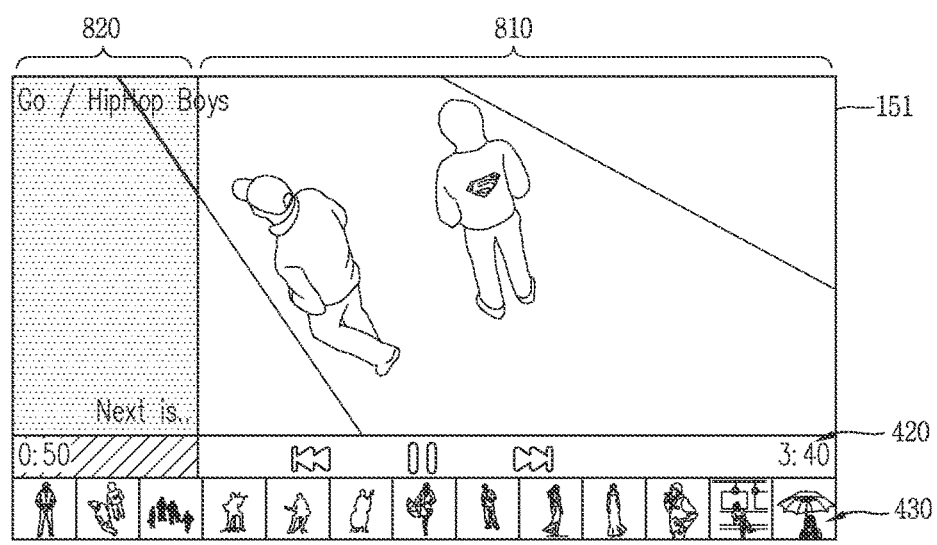
Figure 8A:
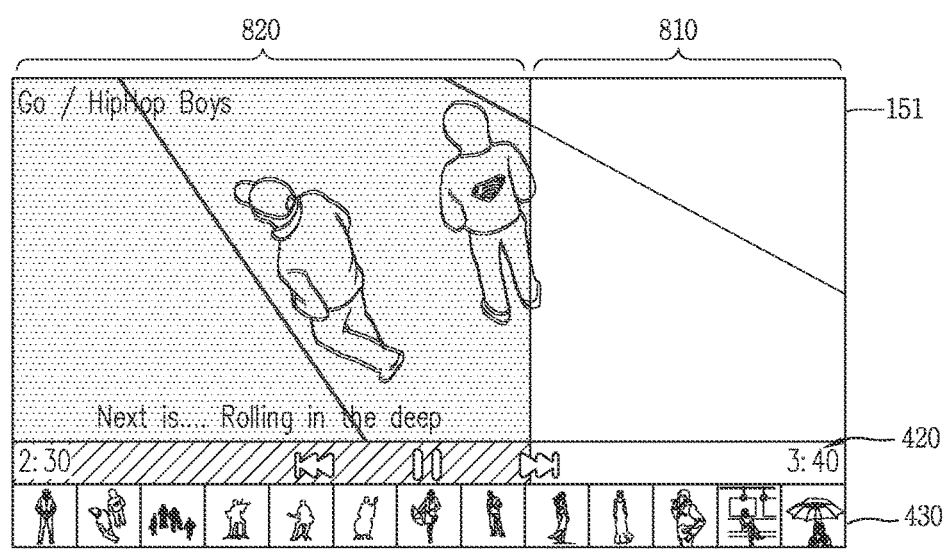

A method of outputting information relating to the song that is being reproduced currently is described in more detail below referring to the accompanying drawings. FIGS. 8A(a) to 8A(c), 8B(a) to 8B(c), 8C(a) to 8C(c), 8D(a) and 8D(b), 9A(a) to 9A(c), 9B(a) to 9B(c), 9C(a) and 9C(b), 9D(a) and 9D(b), 9E(a) and 9E(b), and 9F(a) and 9F(b) are diagrams describing the method of providing the information on the song that is being reproduced currently in the electronic apparatus according to an embodiment of the present invention.

The method of using the graphic objects corresponding to the songs included in the playlist according to the embodiment is described above. Further, according to an embodiment of the present invention, in addition to the method of utilizing the graphic object, a piece of information on the song that is being reproduced currently and pieces of information on the songs included in the playlist are provided by utilizing additional information.

As one example, the display unit 151 of the electronic apparatus according to the invention is partitioned into multiple regions. For example, as illustrated in FIG. 8A(a), the information on the song is output to one region 410 among the multiple regions, and the graphic objects are arranged on one different region 430. At this time, the information on the song is included in an image corresponding to the graphic object linked to the song. As described above, the graphic object is a thumbnail of the image linked to the song.

Furthermore, among the multiple regions, there is a region 420 to which a progress bar indicating information on the state where the song is being reproduced currently is output. Thus, in the electronic apparatus according to an embodiment of the present invention, the information relating to the reproduction of the song is provided in various ways by utilizing the multiple regions. Further, the electronic apparatus according to one embodiment, which includes the display unit 151 having the region 430 on which the graphic objects are arranged, is described below, but according to one embodiment, the display unit 151 may not have the region 430 on which the graphic objects are arranged.

In the electronic apparatus according to an embodiment of the present invention, the information on the extent to which the song is being reproduced currently is provided by utilizing the image corresponding to the song. For example, as illustrated in FIG. 8A(a), the controller 180 changes a shape of at least one portion of the image corresponding to the song that is output to the one region 410, and thus provides the information on the reproduction time to reproduce the song. As illustrated in FIGS. 8A(a) to 8A(c), the controller 180 performs blurring processing on the image, corresponding to the time that elapses from when the song starts to be reproduced. In this instance, the longer the time to reproduce the song, the blurrier the image appears. The controller 180 gradually increases a range in which the shape of the image is changed, according to the extent to which the song is reproduced. For example, the range in which the shape of the image is changed, as illustrated in FIGS. 8A(a) to 8A(c), corresponds to a size of the image in the progress bar 420, which is changed according to the time that elapses from when the song starts to be reproduced.

Further, as the song is reproduced, the controller 180 gradually changes at least one among the brightness, the luminance, and the saturation of the image included in the one region 410. Thus, with the extent to which the shape of the image is changed, the user intuitively obtains information on the extent to which the song is being reproduced currently.

Figure 8B:
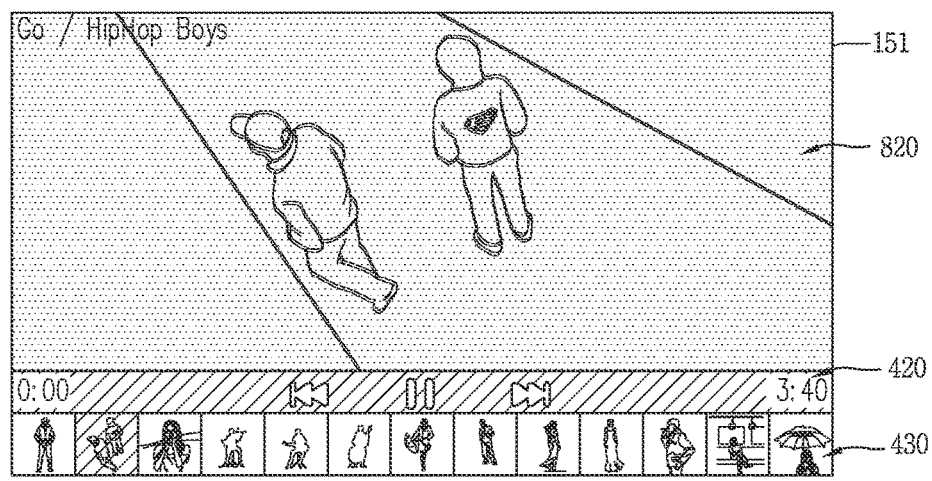
Figure 8B:
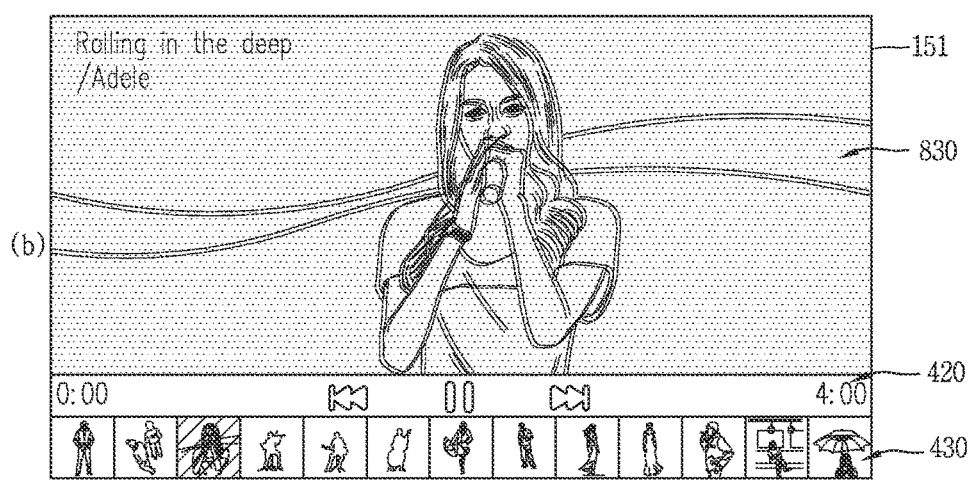
Figure 8B:
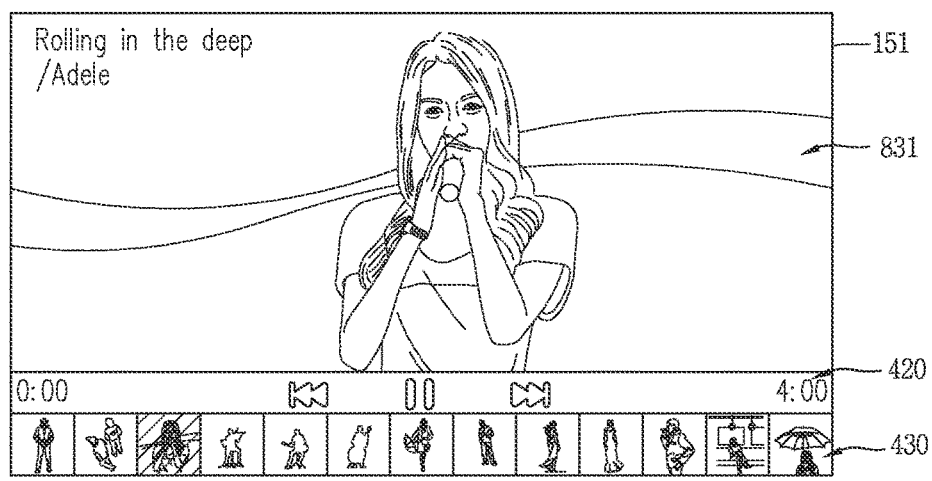

Further, when the song stops being reproduced, the controller 180, as illustrated in FIG. 8B(a), entirely changes a shape of an image 820 that corresponds to the song the reproduction of which is stopped. For example, the blurring processing is performed on the entire image. That is, according to the time that elapses from which the song starts to be reproduced, the image corresponding to the song gradually fades out. Then, the controller 180, as illustrated in FIGS. 8B(b) and 8B(c), caused an image 830, which corresponds to the next song, to gradually fade in.

Thus, according to the time that elapses from when the song starts to be reproduced, the controller 180 causes the image to fade in or fade out, and thus outputs the information on the extent to which the song is reproduced. Furthermore, with the user of the fading-out and the fading-in, screen information is continuously changed that is output to the display unit 151. Accordingly, since the screen information is continuously changed, a residual image remains on the display unit 151, and thus the user can be provided with more clear, precise screen information.

Figure 8C:
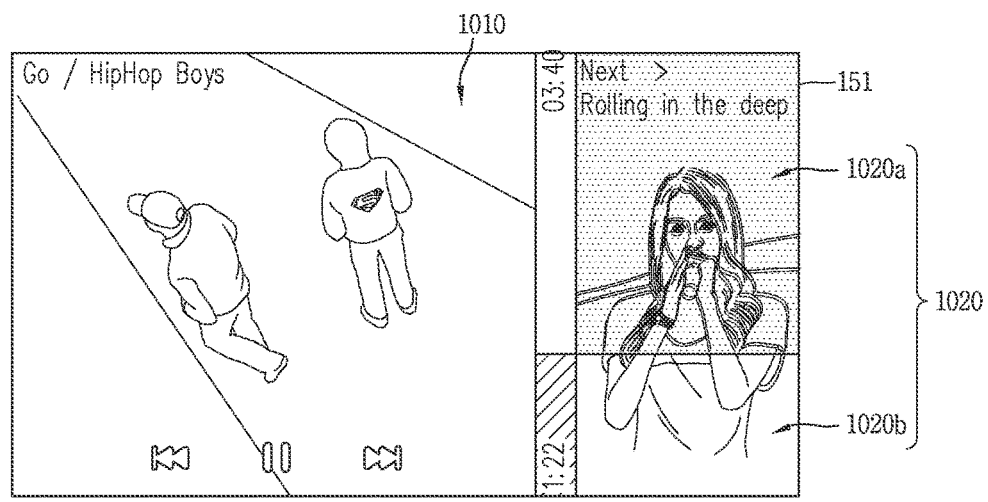
Figure 8C:
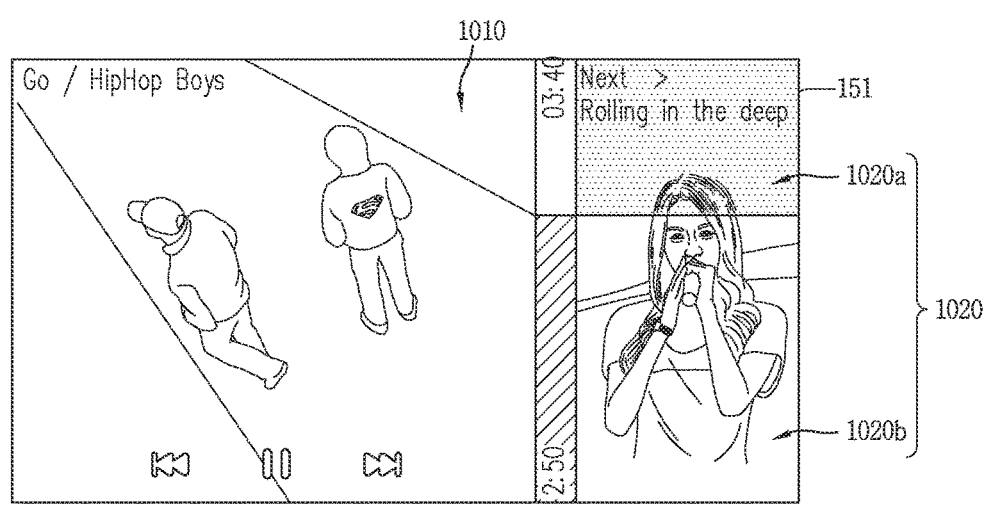
Figure 8C:
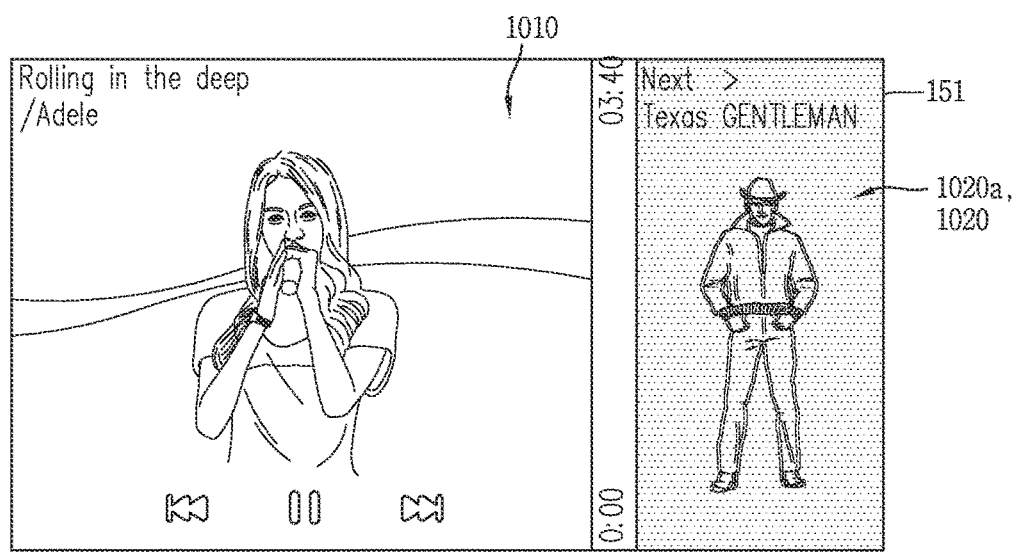

As another example, the display unit 151, as illustrated in FIG. 8C(a) to 8C(c), includes one region 1010 including an image corresponding to a song that is being reproduced currently and one different region 1020 including an image corresponding to the next song to be reproduced.

At this time, the controller 180 gradually changes a shape of the image included in the one different region 1020 according to the extent to which the song is being reproduced currently. For example, the controller 180 partitions the image included in the one different image 1020 into first and second regions 1020a and 1020b. The controller 180 performs the blurring processing on the first region 1020a and outputs the resulting first region 1020a, and outputs the second region 1020b without performing the blurring processing on it. A size of the first region 1020a on which the blurring processing is performed is gradually decreased according to the extent to which the song is being reproduced currently. Further, at this time, the sizes of the first and second regions 1020a and 1020b are changed, corresponding to a speed at which a bar image is changed on the progress bar indicating the extent to which the song is being reproduced currently.

Further, when the song stops being reproduced, the image being output to the one different region 1020, as illustrated in FIG. 8C(c), is output to the one region 1010. Further, according to one embodiment, the method of performing the blurring processing on the image being output to the one different region 1020 is described above, but according to one embodiment of the present invention, the shape of the image being output to the one different region 1020 is changed in various ways, and thus the information on the extent to which the song is being reproduced currently is provided.

Figure 8D:
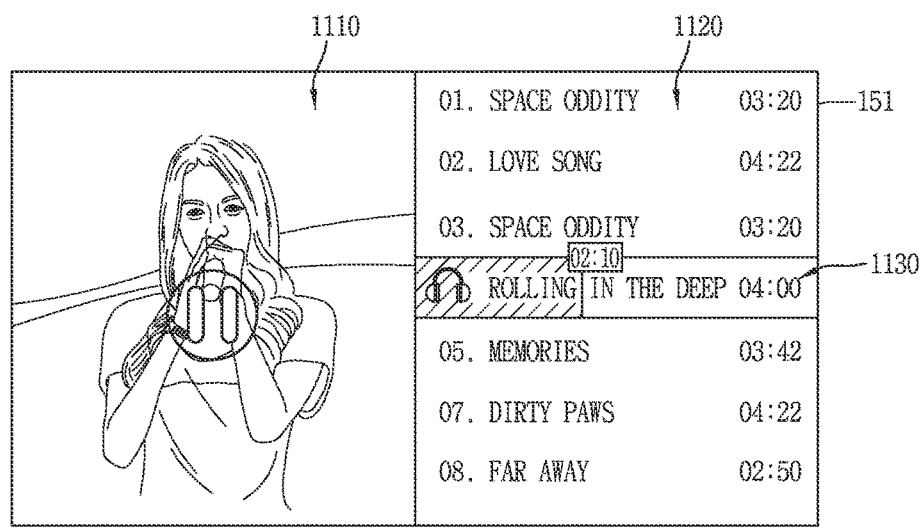
Figure 8D:
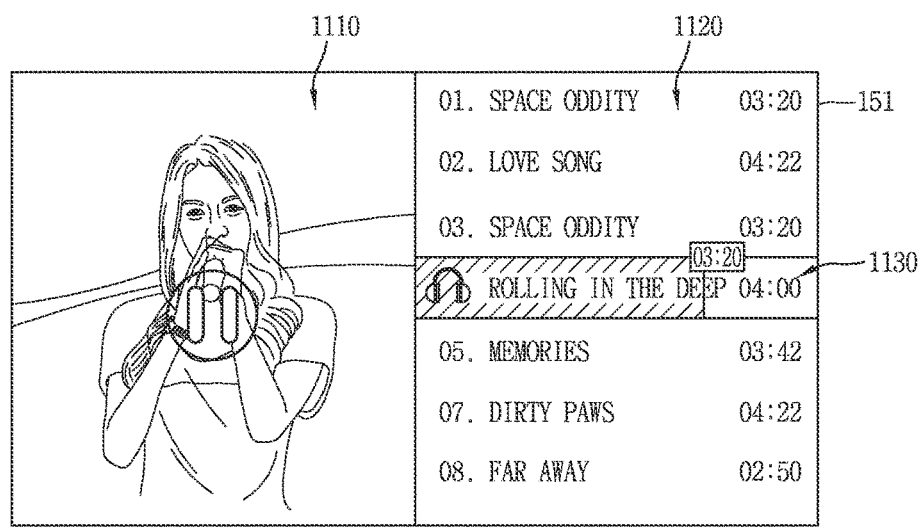

According to another embodiment, as illustrated in FIGS. 8D(a) and 8D(b), the controller 180 outputs a playlist 1120 to one region of the display unit 151. The playlist 1120, as illustrated, is provided in the text format. The playlist 1120 includes items corresponding to the songs included in the playlist 1120, respectively. In this instance, the controller 180 utilizes an item 1130 corresponding to the song that is being reproduced currently, as a region to which the progress bar indicating the extent to which the song is being reproduced currently is output. Accordingly, the progress bar is additionally output to the region to which the item 1130 is output. When this is done, the user is provided with all of the information on the playlist, information on which portion of the playlist the song that is being reproduced currently is included in, and the information on the extent to which the song is being reproduced currently.

Figure 9A:
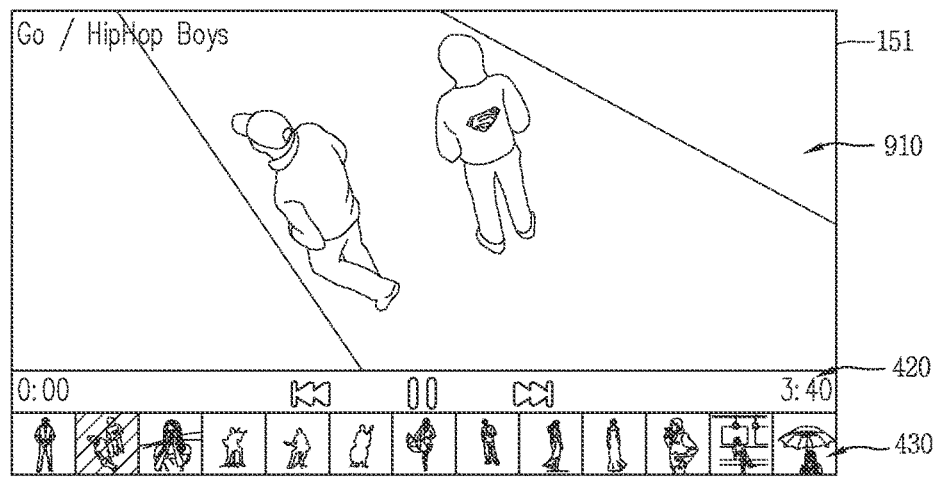
Figure 9A:
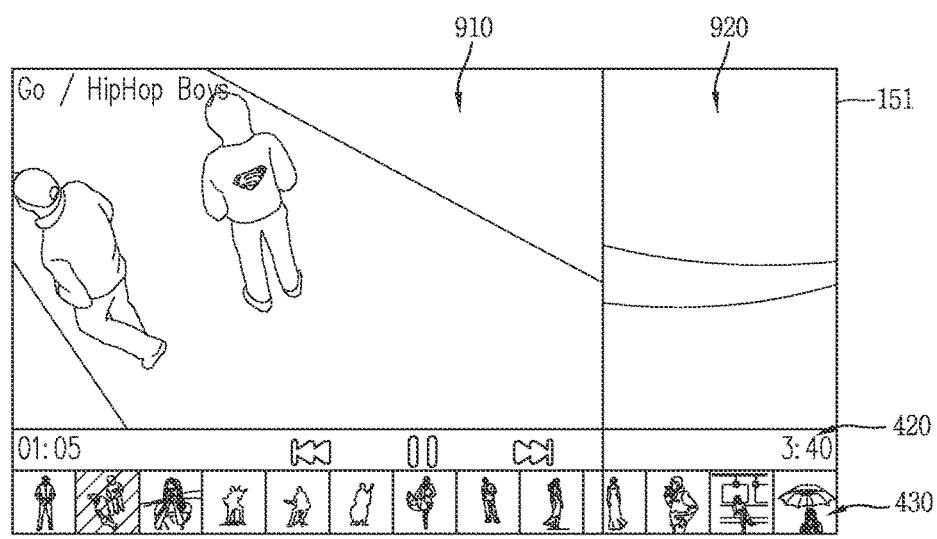
Figure 9A:
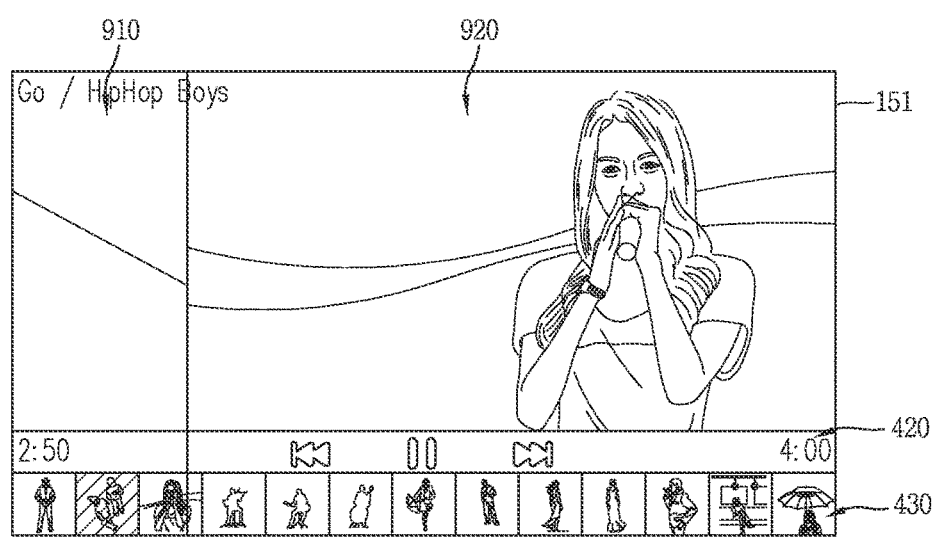

As another example, in the electronic apparatus according to an embodiment of the present invention, the controller 180, as illustrated as FIGS. 9A(a) to 9A(c), gradually moves an image 910 corresponding to the song that is being reproduced currently according to the time that elapse from when the song starts to be reproduced. Accordingly, with the extent to which the image 910 is moved, the controller 180 intuitively provides the information on the extent to which the song is being reproduced currently. Furthermore, according to the movement of the image 910, the controller 180 outputs an image 920 corresponding to the next song to be reproduced. That is, the image 920 corresponding to the graphic object that is positioned adjacent to the graphic object corresponding to the song, among the graphic objects, is gradually output in a predetermined proceeding direction, corresponding to the movement of the image 910.

Further, one region of the display unit 151 is partitioned into at least two regions, corresponding to the movements of the images 910 and 920. At this time, the controller 180 provides information on each of the songs that are linked to the images corresponding to the regions, respectively, corresponding to the selection of each of the regions that result from the partitioning or corresponding to the pointer image being positioned in each of the regions that result from the partitioning. For example, as illustrated in FIG. 9B(a), when a first image 910 corresponding to the song that is being reproduced currently is output, the controller 180 outputs icons for providing the information on the song that is being reproduced currently and for providing a function associated with the song that is being reproduced currently.

Figure 9B:
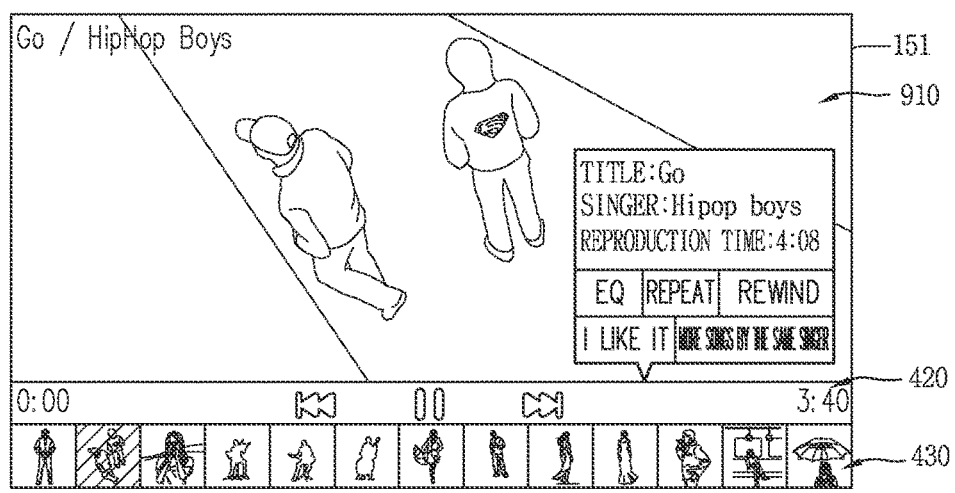
Figure 9B:
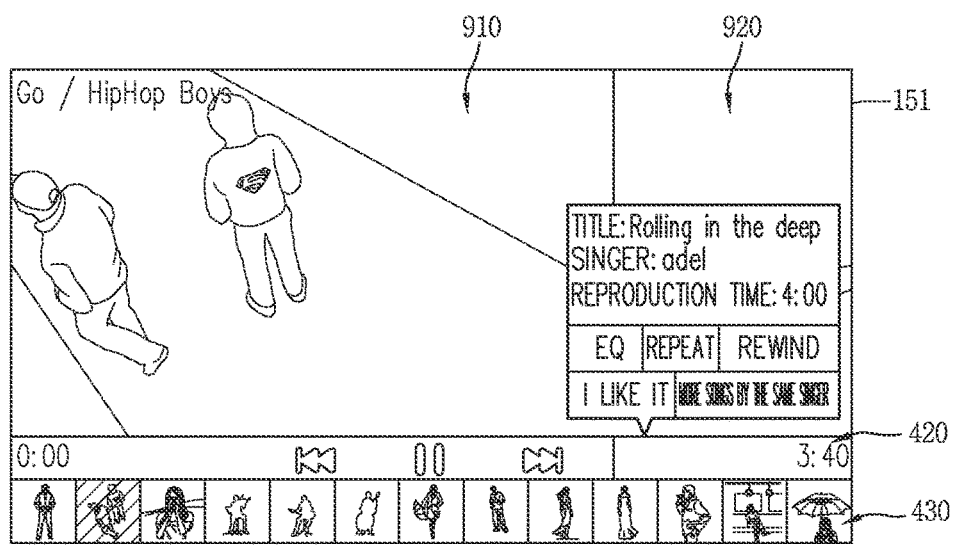
Figure 9B:
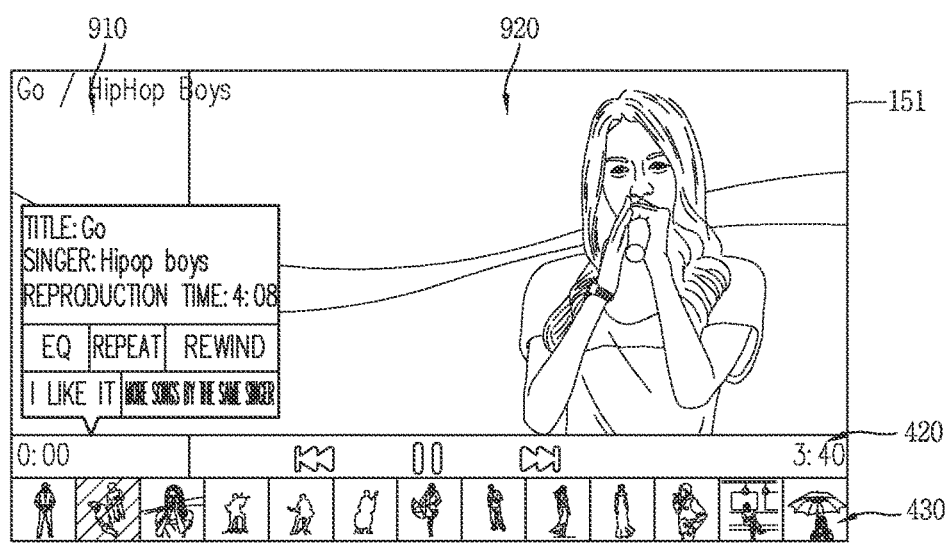

Then, as illustrates in FIG. 9B(b), when the image 920 corresponding to the next song to be reproduced is output according to the reproduction of the song, and when the image 930 corresponding to the next song to be reproduce is selected, or the pointer image is positioned in the image 920 corresponding to the next song, at least one among the information linked to the next song and the icon corresponding to the function linked to the next song is output.

Further, as illustrated in FIG. 9B(c), when the image 910 corresponding to the song that is being reproduced currently is selected, or the pointer image is positioned in the image 910, at least one among the information linked to the song that is being reproduced currently and the icon corresponding to the function linked to the song that is being reproduced currently is output. That is, in this instance, the controller 180 provides the pieces of information on the different songs and the function associated with the different songs by utilizing the regions that result from the partitioning.

Figure 9C:
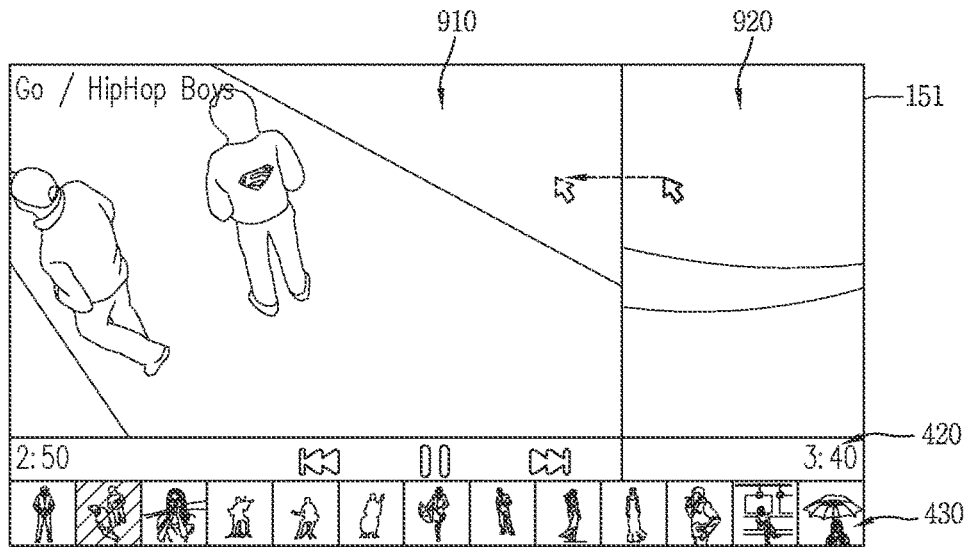
Figure 9C:
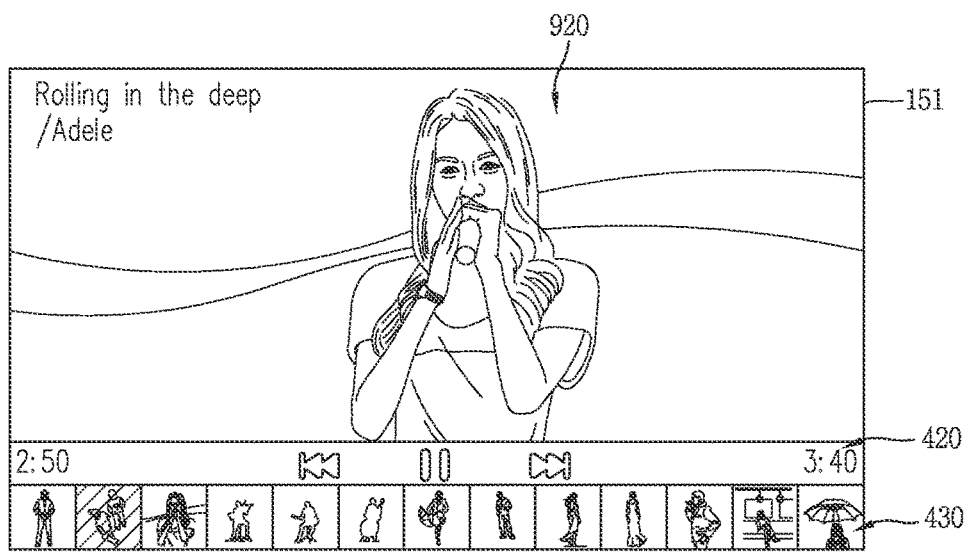

Further, as illustrated in FIGS. 9C(a) and 9C(b), at least one among the images 910 and 920 that are output to one region is moved based on the user's selection or the user's request. At this time, corresponding to the movement of the image, it is possible to change the extent to which the song is reproduced can be changed or it is possible to stop reproducing the song and enable the next song to be reproduced. In addition, the user's request corresponds to the remote control signal that is received from the remote controller (or the remote control device 200).

As one example, as illustrated in FIGS. 9C(a) and 9C(b), based on the user's request or the user's selection, when the first image 910 switches to a second image 920, the controller 180 stops reproducing the song corresponding to the first image 910 and reproduces the song corresponding to the second image. As described above, in the electronic apparatus according to an embodiment of the present invention and the method of controlling the electronic apparatus, a user interface is provided through which the information relating to the reproduction is provided or the extent to which the reproduction of the song proceeds is controlled by utilizing the images corresponding to the songs.

An example is described below in which, corresponding to the remote control signal that is received from the remote controller (or the remote control device 200), the song is no longer reproduced and thus another song is reproduced, or the extent to which the song is reproduced is controlled.

A method is described below in which the reproduction of the song is controlled corresponding to the movement of the remote controller. However, a user's touch on a touch pad that is provided in the remote controller may be substituted for the movement of the remote controller described below.

Furthermore, the reproduction of the song is described below as being controlled according to the movement of the movement of the remote controller, but an occurrence of the remote control signal due to the movement of the remote controller is possible when in addition to the movement of the remote controller, an additional operation (for example, selection of a specific key provided in the remote controller) is performed. However, a modification of the additional operation of generating the remote control signal according to the movement of the remote controller is possible in various ways. A detailed description of the modification may depart from the gist of the present invention and thus is omitted.

According to an embodiment of the present invention, at least one among the images that are output to the display unit 151 is moved by the pointing of the point image 911 or by being selected by the point image 911. Furthermore, according to one embodiment of the invention, the images 910 and 920 are moved without outputting the pointer image 911, or when the pointer image 911 points to a specific image, the specific is accordingly moved.

An example of a method of controlling the images 910 and 920 by utilizing the pointer image 911 is described below. Corresponding to the remote control signal, the image 911 being output to the display unit 151 is moved, or a position to which the image 911 is output is changed.

Further, the remote control signal for moving the pointer image 911 is received corresponding to the movement of the remote controller. That is, in this instance, sensors that detect the movement of the remote controller are arranged on the remote controller. The sensor is at least one among an acceleration sensor, a magnetic sensor, a G-sensor, a gyroscope sensor and a motion sensor. Accordingly, if the user moves, holding the remote controller in his/her hand, the remote controller generates the remote control signal corresponding to the user's movement.

As another example, the remote control signal for moving the pointer image 911 is generated, corresponding to user's operation of a wheel, a touch pad, a directional key button, or the like that is mounted in the remote controller. Further, only if the image 910 or 920 that the pointer image 911 points to is selected, the controller 180 moves at least one among the images 910 and 920, corresponding to the signal that is received from the remote controller. In addition, the processing is performed, corresponding to the selection of the image 910 or 920, or the remote control signal that is received from the remote controller. There are various methods of selecting the image 910 or 920 through the remote controller.

Figure 9D:
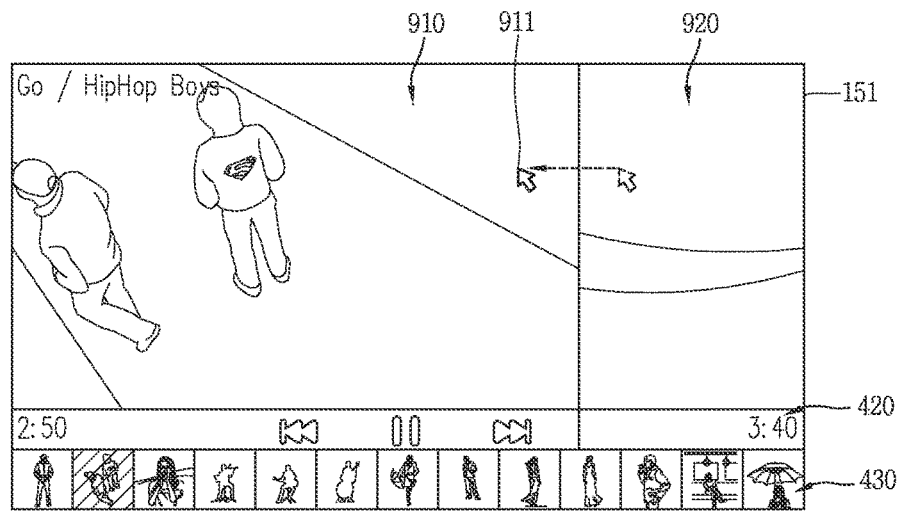
Figure 9D:
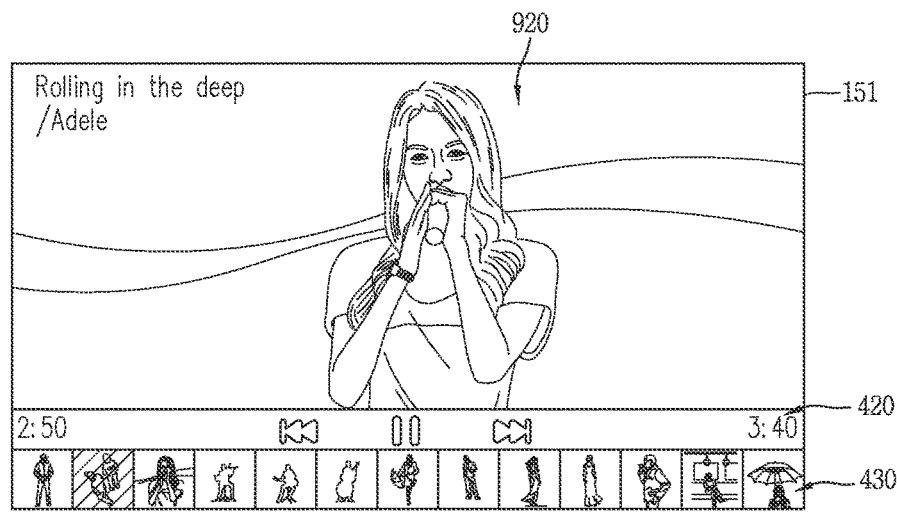
Figure 9D:
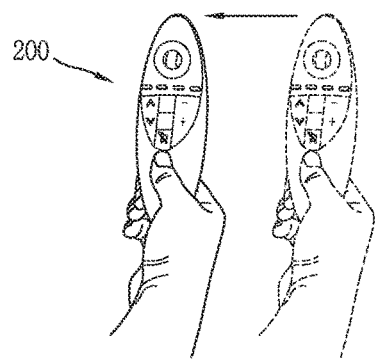

First, an example is described in which the song is changed corresponding to the movement of the remote controller (or the remote control device 200). The controller 180, as illustrated in FIGS. 9D(a) and 9D(b), moves the pointer image 911 from one image 920 (the second image) to the other image 910 (the first image), corresponding to the movement of the remote controller (or the remote control device 200). A direction in which the pointer image 911 is moved corresponds to the movement of the remote controller (or the remote control device 200).

Further, corresponding to the movement of the remote controller (or the remote control device 200), the controller 180, as illustrated in FIG. 9D(b), moves the first image 910 so the entire second image 920 is output to the display unit 151. For example, when the first and second images 910 and 920 are gradually moved according to the extent to which the song is reproduced, and the first image 910 corresponding to the song that is being reproduced currently is arranged to the left side and the second image 920 corresponding to the next song to be reproduced is arranged to the right side, when the first image 910 disappears from the display unit 151, corresponding to the movement of the remote controller (or the remote control device 200), the controller 180 reproduces the song corresponding to the second image 920.

That is, if due to the movement of the remote controller (or the remote control device 200), the first image 910 is no longer output on the display unit 151, the controller 180 stops reproducing the song linked to the first image 910 and reproduces the song linked to the second image 920.

As another example, corresponding to the movement of the remote controller (or the remote control device 200), the controller 180 performs a forwarding or rewinding operation on the song that is being reproduced currently. At this time, based on the direction in which the remote controller (or the remote control device 200) is moved, the controller 180 determines whether the forwarding function or rewinding operation is performed.

Figure 9E:
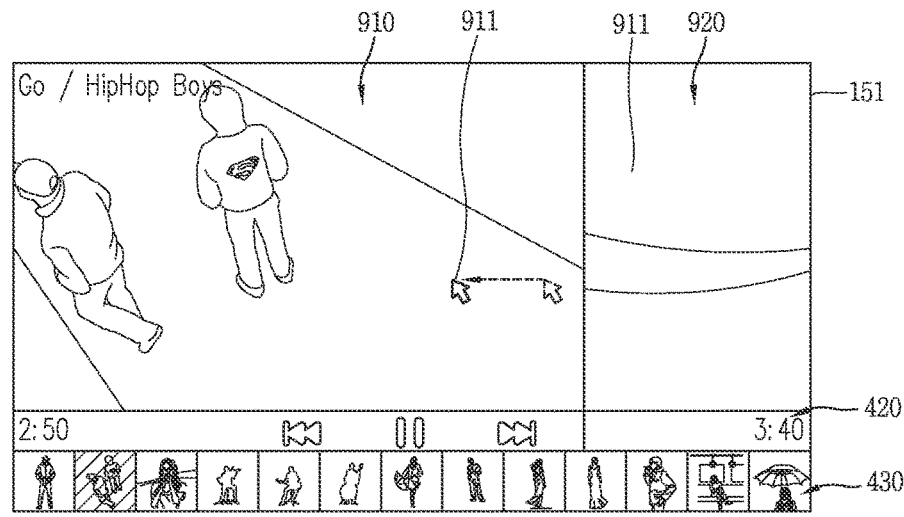
Figure 9E:
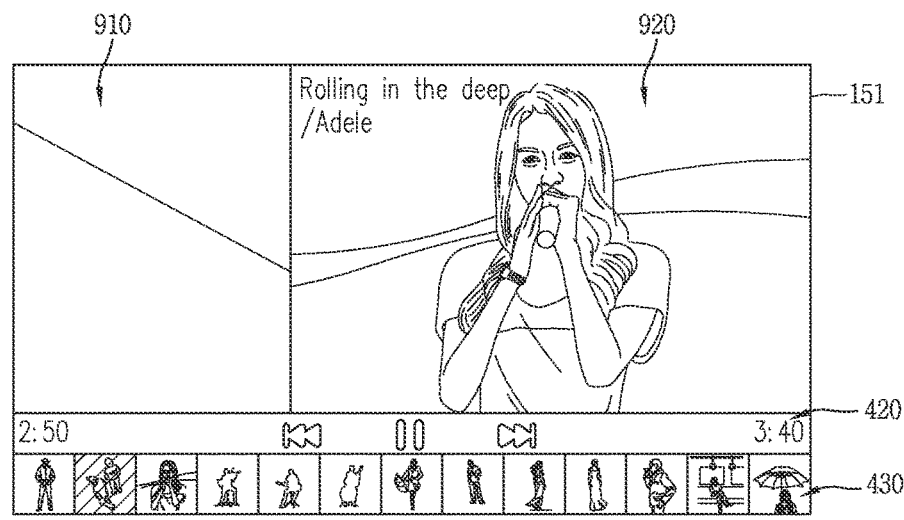
Figure 9E:
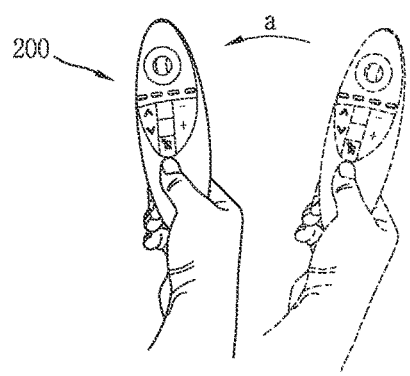
Figure 9F:
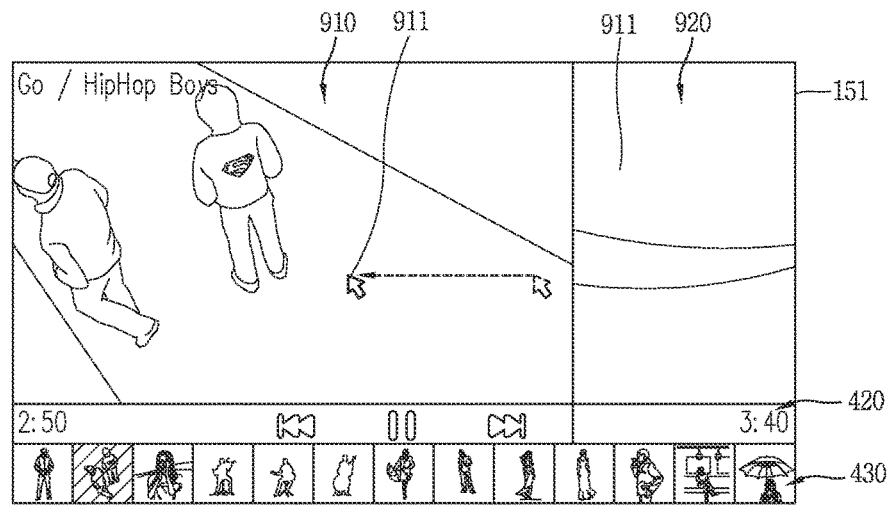
Figure 9F:
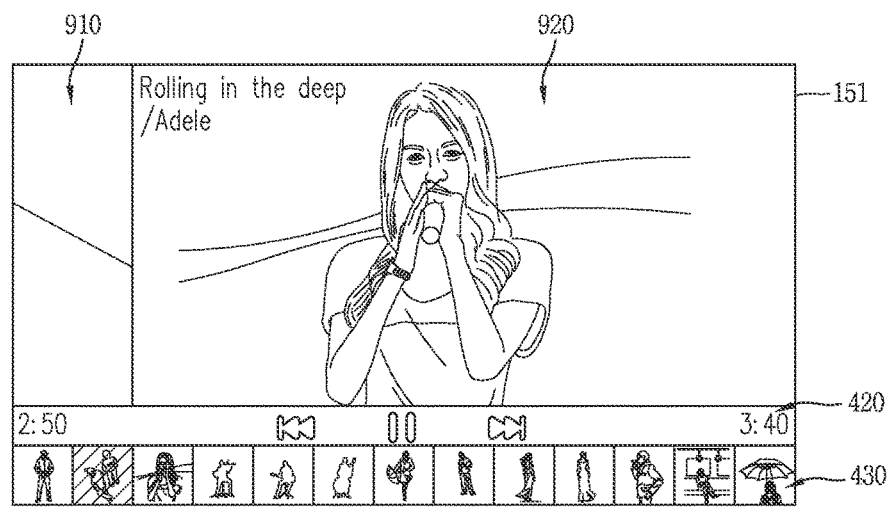
Figure 9F:
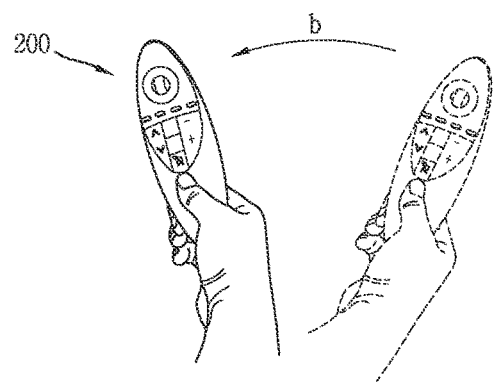

Further, according to the extent to which the remote controller (or the remote control device 200) is moved, the controller 180 controls a speed at which the forwarding or rewinding operation is performed. For example, if the extent to which the remote controller (or the remote control device 200) is moved in FIGS. 9E(a) and 9E(b) and the extent to which the remote controller is moved in FIGS. 9F(a) and 9F(b) are different from each other, such as when an amount of movement of the remote controller (or the remote control device 200) corresponding to a second length b in FIGS. 9F(a) and 9F(b) is greater than an amount of movement of the remote controller corresponding to a first length a in FIGS. 9E(a) and 9E(b), the controller 180 performs control so the forwarding or rewinding speed in the case in FIGS. 9F(a) and 9F(b) is higher than that in the case in FIGS. 9E(a) and 9E(b).

Further, the first and second images 910 and 920 are moved on the display unit 151, when the speeds at which the first and second images 910 and 920 are moved are linked to the control of the extent to which the song is reproduced. Furthermore, the speeds at which the first and second images 910 and 920 are moved corresponding to the forwarding or rewinding speed of the song.

As described above, in the electronic apparatus according to the present embodiment, the reproduction of the song is controlled in a more intuitive manner by utilizing the movement of the remote controller and the image corresponding to the song.

Furthermore, in the electronic apparatus according to an embodiment of the present invention and the method of controlling the electronic apparatus, while a piece of music is being reproduced, information on the playlist to which the piece of music belongs, is provided through the use of the image linked to the song. Accordingly, through the use of the image, the user is provided, in a more intuitive manner, with the information relating to the reproduction of the song.

Furthermore, the electronic apparatus according to an embodiment of the present invention and the method of controlling the electronic apparatus provides the information on the extent to which a piece of music is being reproduced currently, through the use of the image linked to the song. Accordingly, the user obtains the information on the extent to which the song is reproduced, in an intuitive manner, through the use of the image.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments and advantages are merely and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. An electronic apparatus comprising:
    an audio output unit configured to output audio information on a song being reproduced;
    a display unit; and
    a controller configured to:
    divide a display area of the display unit into multiple regions,
    determine display sizes of graphic objects respectively linked to songs that are included in a playlist based on a number of songs included in the playlist,
    wherein the smaller the number of songs included in the playlist, the larger the display sizes of the graphic objects, and
    wherein the graphic objects have a form of a square, and transverse and longitudinal lengths of the graphic objects are varied based on the number of songs included in the playlist,
    arrange, along a predetermined direction, the graphic objects on a first region of the multiple regions of the display unit so the first region is occupied,
    wherein a transverse length of the first region on which the graphic objects are displayed is fixed,
    wherein a longitudinal length of the first region is varied with the number of songs included in the playlist,
    wherein the smaller the number of songs included in the playlist, the longer the longitudinal length of the first region, and
    wherein a guide image indicating a reproduction of a song being reproduced is overlapped with a graphic object corresponding to the song being reproduced, and
    display an image related to the song being reproduced on the second region,
    wherein the second region is positioned at an upper portion than the first region,
    wherein a longitudinal length of the second region is varied based on the change of the first region,
    wherein the image related to the song being reproduced gradually fades out according to a time that elapses from when the song starts to be reproduced, and another image related to a next song to be reproduced gradually fades in on the second region, and
    wherein when the song being reproduced is finished, the image related to the song disappears from the second region and the another image related to the next song remains on the second region.

2. The electronic apparatus of claim 1, wherein the controller is further configured to superimpose the guide image onto at least one portion of the corresponding graphic object.

3. The electronic apparatus of claim 2, wherein the controller is further configured to:
    reproduce an order of the songs included in the playlist corresponding to an order in which the graphic objects are arranged, and
    when the reproduction of the song is finished, reproduce a song corresponding to a graphic object adjacent to the corresponding graphic object, and superimpose the guide image onto the adjacent graphic object.

4. The electronic apparatus of claim 1, wherein the controller is further configured to:
    reproduce the songs included in the playlist based on order in which the graphic objects are arranged, and change a reproduction order of the songs included in the playlist based on a movement of at least one graphic object.

5. The electronic apparatus of claim 4, further comprising:
a receiving unit configured to receive a remote control signal corresponding to movement from a remote controller,
wherein the controller is further configured to move the graphic object based on the remote control signal.

6. The electronic apparatus of claim 1, wherein the controller is further configured to:
superimpose the guiding image onto at least one portion of the graphic object corresponding to the song that is being reproduced, and
change an area of the guiding image according to an extent to which the song is being reproduced.

7. The electronic apparatus of claim 1, wherein the controller is further configured to:
display a moveable pointer on the display unit,
select a graphic object through the pointer, and
perform a function associated with the song corresponding to the selected graphic object.

8. The electronic apparatus of claim 7, wherein the controller is further configured to:
move the selected graphic object corresponding to a movement of the pointer, and
when the selected graphic object is moved by a predetermined distance or above, exclude the song corresponding to the selected graphic object from the playlist.

9. The electronic apparatus of claim 8, wherein when the song corresponding to the selected graphic object is excluded from the playlist, the controller is further configured not to arrange the selected graphic object together with the graphic objects on the display unit.

10. The electronic apparatus of claim 1, wherein the controller is further configured to determine the transverse length of each of the graphic objects according to a time to reproduce the song corresponding to each of the graphic objects.

11. The electronic apparatus of claim 1, wherein the controller is further configured to change a shape of at least one portion of the image according to a time that elapses from when the song starts to be reproduced.

12. The electronic apparatus of claim 11, wherein the controller is further configured to gradually blur processing on the image corresponding to the time that elapses from which the song starts to be reproduced.

13. A method of controlling an electronic apparatus, the method comprising:
dividing a display area of a display unit of the electronic apparatus into multiple regions;
determining, via a controller of the electronic apparatus, display sizes of graphic objects respectively linked to songs that are included in a playlist based on a number of songs included in the playlist,
wherein the smaller the number of songs included in the playlist, the larger the display sizes of the graphic objects, and
wherein the graphic objects have a form of a square, and transverse and longitudinal lengths of the graphic objects are varied based on the number of songs included in the playlist;
arranging, via the controller of the electronic apparatus, the graphic objects along a predetermined direction on a first region of the multiple regions of the display unit so the first region is occupied,
wherein a transverse length of the first region on which the graphic objects are displayed is fixed,
wherein a longitudinal length of the first region is varied with the number of songs included in the playlist,
wherein the smaller the number of songs included in the playlist, the longer the longitudinal length of the first region, and
wherein a guide image indicating a reproduction of a song being reproduced is superimposed onto at least one portion of a graphic object corresponding to the song being reproduced; and
displaying an image related to the song being reproduced on the second region,
wherein the second region is positioned at an upper portion than the first region,
wherein a longitudinal length of the second region is varied based on the change of the first region,
wherein the image related to the song being reproduced gradually fades out according to a time that elapses from when the song starts to be reproduced, and another image related to a next song to be reproduced gradually fades in on the second region, and
wherein when the song being reproduced is finished, the image related to the song disappears from the second region and the another image related to the next song remains on the second region.

14. The method of claim 13, further comprising:
causing an order in which the songs included in the playlist are reproduced to correspond to an order in which the graphic objects are arranged and reproducing a song corresponding to a graphic object adjacent to the corresponding graphic object when the reproduction of the song is finished.

15. The method of claim 14, wherein the guide image is superimposed onto the adjacent graphic object.

16. The method of claim 13, further comprising:
reproducing the songs included in the playlist based on order in which the graphic objects are arranged;
receiving a remote control signal corresponding to movement from a remote controller;
moving the graphic object based on the remote control signal; and
changing a reproduction order of the songs included in the playlist based on a movement of at least one graphic object.

* * * * *